United States Patent
Tinajero et al.

(10) Patent No.: US 11,227,621 B2
(45) Date of Patent: Jan. 18, 2022

(54) SEPARATING DESIRED AUDIO CONTENT FROM UNDESIRED CONTENT

(71) Applicant: DOLBY INTERNATIONAL AB, Amsterdam Zuidoost (NL)

(72) Inventors: Pedro Jafeth Villasana Tinajero, Stockholm (SE); Stanislaw Gorlow, Stockholm (SE)

(73) Assignee: Dolby International AB, Amsterdam Zuidoost (NL)

(*) Notice: Subject to any disclaimer, the term of this patent is extended or adjusted under 35 U.S.C. 154(b) by 192 days.

(21) Appl. No.: 16/572,326

(22) Filed: Sep. 16, 2019

(65) Prior Publication Data
US 2020/0090677 A1 Mar. 19, 2020

Related U.S. Application Data

(60) Provisional application No. 62/732,177, filed on Sep. 17, 2018.

(51) Int. Cl.
*G10L 21/0272* (2013.01)
*G06F 17/16* (2006.01)
(Continued)

(52) U.S. Cl.
CPC .......... *G10L 21/0272* (2013.01); *G06F 17/16* (2013.01); *G06F 40/242* (2020.01); *G10L 21/0364* (2013.01)

(58) Field of Classification Search
None
See application file for complete search history.

(56) References Cited

U.S. PATENT DOCUMENTS

| 8,015,003 | B2 | 9/2011 | Wilson |
| 9,553,681 | B2 | 1/2017 | Hoffman |

(Continued)

FOREIGN PATENT DOCUMENTS

WO 2016050725 A1 4/2016

OTHER PUBLICATIONS

Sun, Meng, et al. "Speech enhancement under low SNR conditions via noise estimation using sparse and low-rank NMF with Kullback-Leibler divergence." IEEE/ACM Transactions on Audio, Speech, and Language Processing 23.7 (2015): 1233-1242. (Year: 2015).*

(Continued)

*Primary Examiner* — Douglas Godbold

(57) ABSTRACT

The present disclosure provides new variants of non-negative matrix factorization suitable for separating desired audio content from undesired audio content. In certain embodiments, a multi-dimensional non-negative representation of an audio signal is decomposed into desired content and undesired content by performing convolutional non-negative matrix factorization (CNMF) on multiple layers, each layer having a respective non-negative matrix representation. In certain embodiments, the desired content is represented by a first dictionary and the undesired content is represented by a second dictionary, and sparsity is imposed on activations of basic elements of the first or the second dictionary, wherein a degree of sparsity is controlled by setting a minimum number of components with significant activations of the first or second dictionary, respectively.

20 Claims, 17 Drawing Sheets

(51) Int. Cl.
*G06F 40/242* (2020.01)
*G10L 21/0364* (2013.01)

(56) References Cited

U.S. PATENT DOCUMENTS

| | | | |
|---|---|---|---|
| 9,607,627 | B2 | 3/2017 | Liang |
| 9,666,183 | B2 | 5/2017 | Visser |
| 9,679,559 | B2* | 6/2017 | Le Roux ............... G10L 15/063 |
| 9,788,119 | B2 | 10/2017 | Vilermo |
| 9,866,954 | B2 | 1/2018 | Germain |
| 9,881,630 | B2 | 1/2018 | Buchner |
| 10,013,975 | B2 | 7/2018 | Guo |
| 2009/0132245 | A1* | 5/2009 | Wilson ............... G10L 21/0208 704/226 |
| 2016/0358107 | A1 | 12/2016 | Kokkinis |
| 2017/0178664 | A1 | 6/2017 | Wingate |
| 2017/0270945 | A1* | 9/2017 | Dimitriadis ......... G10L 21/0208 |
| 2018/0254050 | A1 | 9/2018 | Tashev |

OTHER PUBLICATIONS

Cheng, Guangchun "Video Analytics with Spatio-Temporal Characteristics of Activities" Dissertation prepared for the Degree of Doctor of Philosophy, May 2015, University of North Texas, pp. 1-107.

Germain, F. et al "Speaker and Noise Independent Online Single-Channel Speech Enhancement" IEEE Apr. 19-24, 2015, pp. 71-75.

Germain, F. et al "Speaker and Noise Independent Voice Activity Detection" Interspeech, Lyon, France, Aug. 2013, pp. 1-9.

Ludena-Choez, J. et al "Speech Denoising Using Non-Negative Matrix Factorization with Kullback-Leibler Divergence and Sparseness Constraints" Chapter in Communications in Computer and Information Science—Jan. 2012, p. 1-11.

Schmidt, M. et al "Wind Noise Reduction Using Non-Negative Sparse Coding" IEEE Aug. 27-29, 2007, pp. 431-436.

Tinajero, Pedro Jafeth "New Variants of Nonnegative Matrix Factorization with Applications to Speech and Enhancement and Coding" Master's Degree Project Stockholm, Sweden 2018.

\* cited by examiner

*Forward analysis*

---

*Inverse synthesis*

Forward analysis

- - - - - - - - - - - - - - - - - - - - - - - - - - - - - - - - -

Inverse synthesis

SEPARATING DESIRED AUDIO CONTENT FROM UNDESIRED CONTENT

CROSS-REFERENCE TO RELATED APPLICATIONS

This patent application claims priority to U.S. Provisional Patent Application No. 62/732,177, filed on Sep. 17, 2018, which is hereby incorporated by reference in its entirety for all purposes.

TECHNICAL FIELD

The present disclosure relates to methods of processing an audio signal to separate desired audio content from undesired audio content, and to a related system and computer-readable medium.

BACKGROUND OF THE INVENTION

Non-negative matrix factorization (NMF) is a technique that has been applied on audio signals to perform tasks like audio source separation, music transcription and speech enhancement in noisy recordings.

Typically, the first step in the analysis procedure of audio signals is to split them into frames. This can be achieved, for example, by multiplying the original time-varying signal by a window function of suitable length. Then, the windowed audio signal can be analyzed frame-wise either in the time domain or, as is most commonly done, in the frequency domain through an appropriate transformation, such as the discrete Fourier transform. The characteristics of the window play a key role when the frames are analyzed. Since multiplication in the time domain is equivalent to convolution in the frequency domain, the main lobe width and side lobes height of the window function in the frequency domain are responsible for frequency leakage and aliasing. These properties must be considered when choosing a window. A longer window gives a higher frequency resolution but a lower time resolution, and vice versa. Therefore, when selecting the window length, this trade-off between time and frequency resolution must be considered as well.

Non-negative matrix factorization (NMF) is a method where a K×N matrix V is factorized into a K×I matrix W and a I×N matrix H such that the rank I of the factorization is much smaller than both K and N. Therefore, $$V \cong U = WH$$

can be understood as a decomposition of V into I representative basis vectors collected as the columns of W, each weighted by their respective coefficient row in H. Hence, W is the basis that explains V, and H is the coefficient matrix that is required to approximate V as U.

In order to perform an NMF, a loss function is used to measure the (dis-) similarity between V and U. The loss function has a global minimum if V=U, and it can have multiple local minima otherwise. The factorization is then performed by minimizing the loss function using, for example, alternating gradient descent in order to find W and H.

In NMF, the rank of the factorization I plays an important role. If I is too small, the reconstruction will be poor due to lack of variety and detail. On the contrary, if I is too large, redundancy will be introduced in the basis W by splitting one basis into several. Since it is generally preferred to have an over-complete basis rather than a poor reconstruction, a large I may be chosen. Also, a few elements of W that are most relevant for a good approximation of V can be selected by imposing sparsity on the coefficient matrix H. Sparsity of a matrix is expressed by the number of its near-zero (or negligible) elements.

In audio signal processing, the matrix V is typically a non-negative time-frequency representation, called "spectrogram". The columns of the first factor W represent audio features that are typical for an audio signal of interest. Matrix W is also called "dictionary". The dictionary W can be trained in advance. The factorization of V then involves finding the most suitable coefficient matrix H, such that the original audio represented by V can be reproduced by multiplying W and H, using the pre-trained dictionary.

The factorization can be extended by the use of multiple dictionaries, each with a separate coefficient matrix, such that the matrix representation of the audio signal V is approximated by a linear combination of each basis W with the corresponding coefficient matrix $V \cong \Sigma_{d=1}^{D} W_d h_d$, where D is the number of bases or dictionaries.

SUMMARY

The present disclosure provides new variants of non-negative matrix factorization suitable for separating desired audio content from undesired audio content.

In certain embodiments, a multi-dimensional non-negative representation of an audio signal is decomposed into desired content and undesired content by performing convolutional non-negative matrix factorization (CNMF) on multiple layers, each layer having a respective non-negative matrix representation.

In certain embodiments, the desired content is represented by a first dictionary and the undesired content is represented by a second dictionary, and sparsity is imposed on activations of basic elements of the first or the second dictionary, wherein a degree of sparsity is controlled by setting a minimum number of components with significant activations of the first or second dictionary, respectively. In terms of matrices involved in the process, sparsity can be imposed on the column vectors of the coefficient matrix associated with the first dictionary matrix, or the column vectors of the coefficient matrix associated with the second dictionary, or both.

The present disclosure provides an audio processing method that comprises:
  training a first dictionary for clean desired content;
  receiving an audio signal to be processed, and providing a multi-dimensional non-negative representation of the received audio signal;
  learning a second dictionary for undesired content;
  decomposing the multi-dimensional non-negative signal representation into desired content and undesired content by performing convolutional non-negative matrix factorization (CNMF) in multiple layers, each layer having a respective non-negative matrix representation; wherein the desired content is represented by the first dictionary and a first set of coefficients, and the undesired content is represented by the second dictionary and a second set of coefficients; and
  separating the desired content from the undesired content.
  In a first layer of the CNMF, the signal representation may be decomposed into the first and second dictionaries with the corresponding first and second sets of coefficients; and
  in each higher layer of the CNMF, the representation from the previous layer may be factorized further into a higher layer dictionary and a new representation.

In a typical embodiment, the desired content may include speech.

In order to separate the desired content from the undesired content, weighting, such as spectral weighting, can be used. Another option is to separate the desired content from the undesired content by multiplying the dictionary representing the desired content with the obtained coefficients for the desired content.

In a typical embodiment, the multi-dimensional non-negative signal representation is a two-dimensional time-frequency spectrogram, obtained by performing a short-time Fourier transform.

In some embodiments, the first dictionary comprises a plurality of sub-directories. Each sub-directory may comprise, respectively, one or more basic components of a typical pattern for a given representation of an object of interest.

In some embodiments, sparsity is imposed on activations of basic elements of the first or the second dictionary, wherein a degree of sparsity is controlled by setting a minimum number of components with significant activations of the first or second dictionary.

In some embodiments, multi-channel CNMF is performed by training or learning a common dictionary across multiple channels.

The present disclosure also provides an audio processing method that comprises:
  training a first dictionary for clean desired content;
  receiving an audio signal to be processed, and providing a multi-dimensional non-negative representation of the received audio signal;
  learning a second dictionary for undesired content;
  decomposing the multi-dimensional non-negative signal representation into desired content and undesired content; wherein the desired content is represented by the first dictionary and the undesired content is represented by the second dictionary, and wherein the multi-dimensional non-negative signal representation has at least two dimensions and includes a forward and an inverse transform;
  imposing sparsity on activations of basic elements of the first or the second dictionary, wherein a degree of sparsity is controlled by setting a minimum number of components with significant activations of said first or second dictionary; and
  separating the desired content from the undesired content.

In some embodiments, the separating of the multi-dimensional non-negative signal representation into desired content and undesired content is made by performing convolutional NMF in multiple layers, each layer having a respective non-negative matrix representation.

The present disclosure also provides a corresponding system and a non-transitory computer-readable medium.

BRIEF DESCRIPTION OF THE DRAWINGS

In the following, the present invention will be described in more detail with reference to the appended drawings, showing currently preferred embodiments of the invention and illustrating features thereof.

DETAILED DESCRIPTION

Systems and methods disclosed in the following may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

Figure 1:
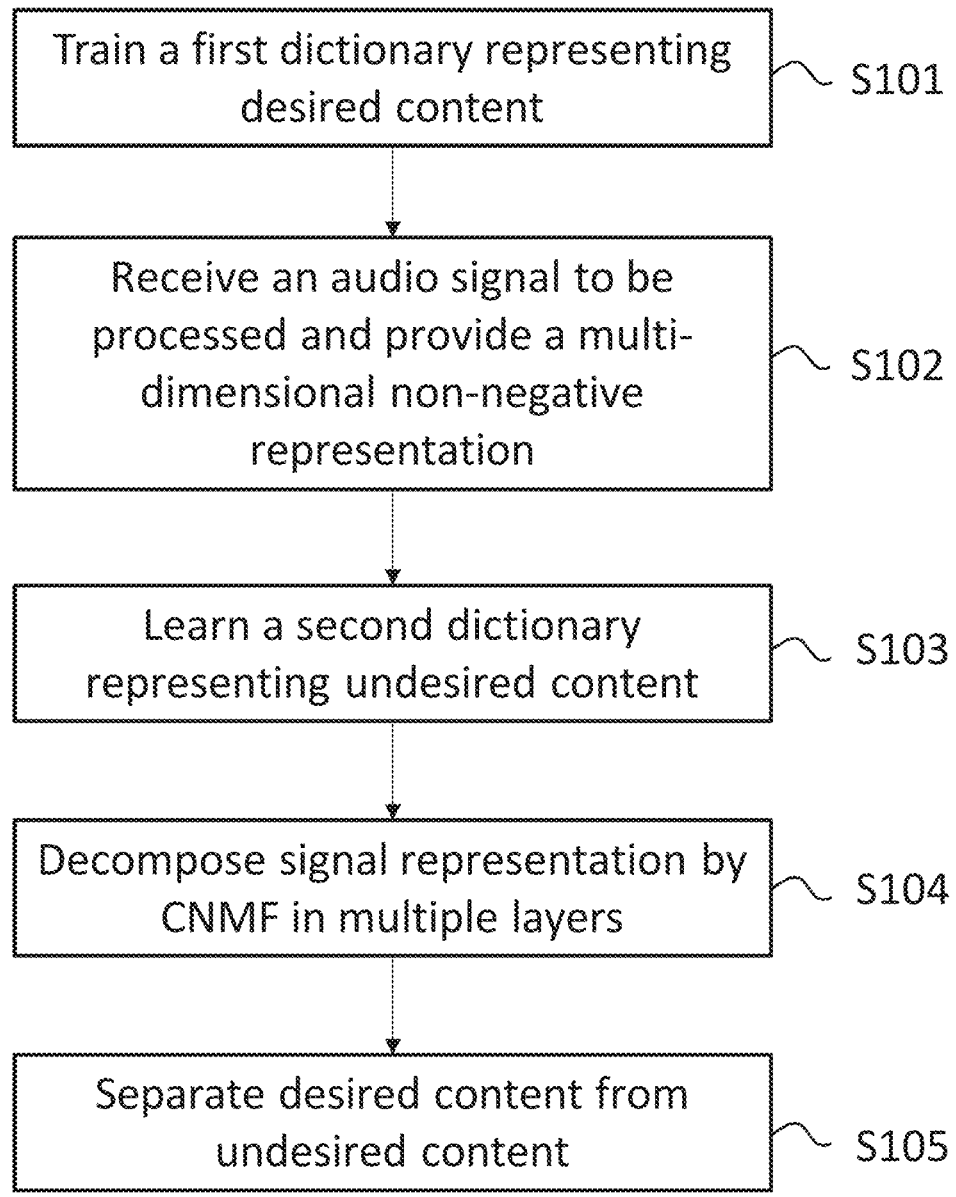
FIG. 1 is a flow chart illustrating an audio processing method in which a multi-dimensional non-negative representation of an audio signal is decomposed by CNMF in multiple layers.

FIG. 1 is a flow chart illustrating an audio processing method according to some embodiments. A first dictionary representing desired content is trained at step S101. The desired content may, for example, be speech. At step S102, an audio signal to be processed is received and a multi-dimensional non-negative representation of the received audio signal is provided. At step S103, a second dictionary is learned representing undesired content. The undesired content may typically be non-speech audio, such as noise or background sounds. The first and second dictionaries are used, at step S104, to decompose the audio signal representation into desired and undesired content using convolutional NMF (CNMF) in multiple layers. It should be noted that steps S103 and S104 are performed simultaneously, not sequentially. The desired content is then separated from the undesired content at step S105. Various implementations of the multilayer CNMF used for decomposing the audio signal representation into desired and undesired content are described below.

Figure 2:
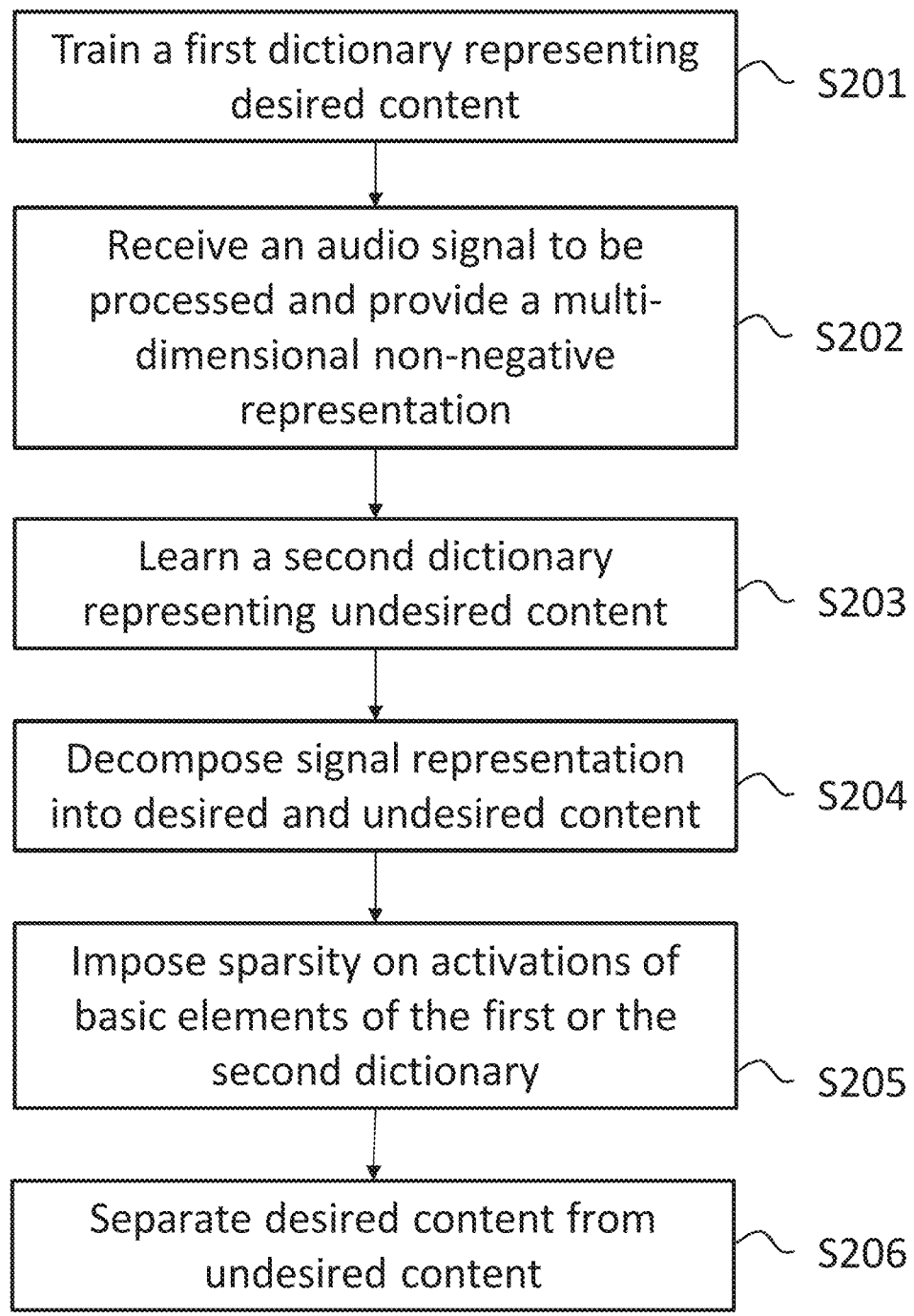
FIG. 2 is a flow chart illustrating an audio processing method in which a multi-dimensional non-negative representation of an audio signal is decomposed into desired and undesired content, wherein sparsity is imposed on activations of basic elements of the first or the second dictionary.

FIG. 2 is a flow chart illustrating an audio processing method according to some embodiments. A first dictionary representing desired content is trained at step S201. The desired content may, for example, be speech. At step S202, an audio signal to be processed is received and a multi-dimensional non-negative representation of the received audio signal is provided. At step S203, a second dictionary is learned representing undesired content. The undesired content may typically be non-speech audio, such as noise or background sounds. The first and second dictionaries are used, at step S204, to decompose the audio signal into desired and undesired content, and at step S205, sparsity is imposed on activations of basic elements of the first or the second dictionary, wherein the sparsity is controlled by setting a minimum number of components with significant activations of the dictionary. It should be noted that steps S203, S204 and S205 are performed simultaneously, not sequentially. The desired content is then separated from the undesired content at step S206. The principle of controlling sparsity by setting a minimum number of components with significant activations of the dictionary is described below.

Figure 3:
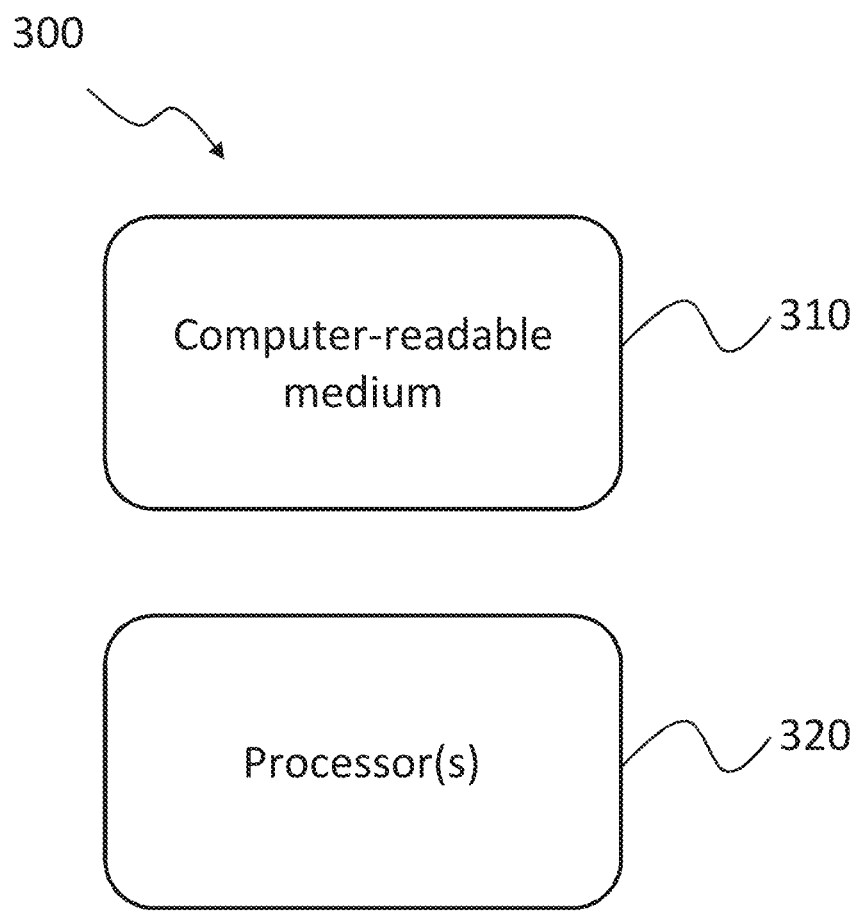
FIG. 3 schematically illustrates a system for audio processing, as well as a computer-readable medium.

FIG. 3 is a schematic drawing showing a system 300 according to some embodiments, comprising one or more processors 320 and a non-transitory computer-readable medium 310 storing instructions that, when executed by the one or more processors, cause the one or more processors to perform an audio processing method as disclosed herein.

Convolutional NMF

Convolutional NMF (CNMF) is an extension of NMF. In CNMF, the basis vectors are extended to matrices in the dimension of time, forming a basis of its own. The approximation of V then becomes $$V \simeq U = \sum_{m=0}^{M-1} W(m)\overset{m}{\overrightarrow{H}} \qquad (2)$$

where $\overset{m}{\overrightarrow{x}}$ is an operator that shifts X to the right by inserting m zero-columns at the beginning while maintaining the original size. This is equivalent to a sum of I truncated convolutions between K×M basis matrices $\{W_i\}$ with their corresponding 1×N coefficient vectors $\{h_i\}$, i.e.

$$V \simeq U = \sum_{i=1}^{I} (W_i * h_i)(n) \qquad (3)$$

ignoring the last M−1 columns of the resulting matrix. It should be noted that if M=1, then this reduces to a non-convolutional NMF.

An extension can also be made to a 2D version of the CNMF, where the coefficient vectors are extended in the dimension of frequency. It should be understood, however, that time and frequency is merely one example and that extension to 2D CNMF can be made also in other domains. The structure in an L×M neighborhood around each element in V is thus exploited:

$$V \simeq U = \sum_{l=0}^{L-1} \sum_{m=0}^{M-1} \overset{l\downarrow}{W}(m)\overset{m}{\overrightarrow{H}}(l) \qquad (4)$$

where $\overset{l\downarrow}{x}$ is the zero-fill down shift operator. This operation can be compared to a sum of I truncated convolutions between the K×M basis matrices $\{W_i\}$ with their corresponding L×N coefficient matrices $\{H_i\}$, i.e.

$$V \simeq U = \sum_{i=1}^{I} (W_i * H_i)(k, n) \qquad (5)$$

ignoring the last M−1 columns and L−1 rows of the resulting matrix. It should be noted that the non-convolutional NMF model is embedded when L=M=1.

Regularization

In the following, regularization, i.e. the enforcement of controlled sparsity, for NMF will be discussed. This represents a way of finding the most compact solution to the factorization. In particular, when the order of "complexity" (e.g. number of principal components) of the underlying signal is known, the enforcement of controlled sparsity described below will give a solution closer to the signal, i.e. one that better models the signal of interest, as compared to previously known methods.

Consider a dictionary W or a coefficient matrix H in the context of NMF that is to be made sparse. As mentioned in the background above, the loss function used in the factorization can have multiple local minima to which the factors W and H could converge. Hence, if a particular solution out of many possible is to be enforced, penalty terms are introduced, which is called regularization. If a factor H, which uses a certain number of basis vectors in W, is sought, a term that penalizes a large number of activations, and thus favors a solution with fewer activations, can be introduced. Therefore, the concept of sparsity enforcement in NMF can be redefined as the reduction of the number of strong components in the factors. With the regularization described below, the number of activations can be controlled in terms of the minimum number (i.e. in terms of a lower bound). While sparsity can be enforced on either or both of W and H, it is typically only enforced on H. If sparsity is to be enforced on the dictionary W, then this is done during the training of W.

Based on this redefinition of sparsity enforcement in NMF, consider now a vector x of rank I that represents a row of W or a column of H. This vector shall be sparse in the sense that $I_x$ elements in the vector are much stronger than the other $I-I_x$ elements for $1 \leq I_x \leq I$. Given the relation $\|x\|_2 \leq \|x\|_1 \leq \sqrt{I}\|x\|_2$ this condition can be achieved by enforcing $\|x\|_1 = \sqrt{I_x}\|x\|_2$. This can be done by minimizing the absolute value of the parameter-dependent norm-difference $$d(x, I_x) = \|x\|_1 - \sqrt{I_x}\|x\|_2 \qquad (6)$$

It should be noted that there is, in principle, no requirement for $I_x$ to be an integer. However, a non-integer value would not make much sense if $I_x$ is interpreted as the minimum number of active bases in the dictionary. The regularizer for the I×N matrix X that enforces sparsity column-wise is thus defined as $$R(X, I_x) \stackrel{def}{=} \sqrt{\sum_{n=1}^{N} d^2(x_n, I_x)} \qquad (7)$$

with $d(x_n, I_x)$ being the norm-difference of the n-th column. If, on the other hand, sparsity is desired to be enforced row-wise, then the regularizer is simply addressed as $R(X^T, I_x)$.

β-Divergence

The loss function used to measure the (dis-) similarity between V and U is usually chosen based on the application and the data to be processed. In order to avoid implementing several algorithms, each minimizing a different loss function, update rules for the decomposition of the signal representation can be based on β-divergence and two-dimensional (2D) CNMF. The loss function can then be expressed as $$\mathcal{L}(V, U) = D_\beta(V\|U) + R_{\lambda_w, \lambda_h}(W, H, I_w, I_h) \qquad (8)$$

with $$D_\beta(V \| U) = \frac{1}{KN} \sum_{k,n} d_\beta(v_{k,n} \| u_{k,n}) \qquad (9)$$

and $$R_{\lambda_w, \lambda_h}(W, H, I_w, I_h) = \lambda_w \frac{1}{K} R(W^T, I_w) + \lambda_h \frac{1}{N} R(H, I_h) \qquad (10)$$

where K and N are introduced to compensate for the different sizes of the matrices in the β-divergence and the regularizer, and where the β-divergence is defined as $$d_\beta(v\|u) = \begin{cases} \frac{v^\beta - u^\beta}{\beta(\beta-1)} - \frac{v-u}{\beta-1} u^{\beta-1} & \text{for } \beta \in \mathbb{R} \setminus \{0,1\}, \\ \frac{v}{u} - \log \frac{v}{u} - 1 & \text{for } \beta = 0, \\ v \log \frac{v}{u} - v + u & \text{for } \beta = 1, \end{cases} \qquad (11)$$

The matrices W and H are the dictionary and coefficient matrix that consider the total contribution, spread over time and frequency, respectively, i.e.

$$W = \sum_{m=0}^{M-1} W(m), \qquad (12)$$

$$H = \sum_{l=0}^{L-1} H(l).$$

The W transpose in equation (10) above indicates that the dictionaries are made sparse row-wise. It should also be noted that the parameters for making W and H sparse can be different. The multiplicative update for factor X can then be written as $$X \leftarrow X \circ \frac{\nabla_X^- D_\beta(V\|U) + \nabla_X^- R_{\lambda_w, \lambda_h}(W, H, I_w, I_h)}{\nabla_X^+ D_\beta(V\|U) + \nabla_X^+ R_{\lambda_w, \lambda_h}(W, H, I_w, I_h)}. \qquad (13)$$

In equation (13), $\nabla$ is the gradient operator and $\nabla^+$ and $\nabla^-$ denotes the positive and negative parts, respectively, of the gradient. Therefore, the update rules for the loss function according to equations (8)-(10) above are $$W(m) \leftarrow \qquad (14)$$

$$W(m) \circ \circ \frac{\frac{1}{N} \sum_l [\overset{\downarrow}{V} \circ \overset{\downarrow}{U}^{\circ(\beta-2)}] \overset{m}{H^\rightarrow}(l) + \frac{\lambda_w \sqrt{I_w}}{R(W^\top, I_w)}}{\left[\frac{\|W\|_{1_r}}{\|W\|_{2_r}} \circ W + \|W\|_{2_r}\right]}{\frac{1}{N} \sum_l [\overset{\downarrow}{U}^{\circ(\beta-1)}_c] \overset{m}{H^\rightarrow}(l) + \frac{\lambda_w}{R(W^\top, I_w)} [I_w W + \|W\|_{1_r}]}$$

$$H(l) \leftarrow H(l) \circ \circ \frac{\frac{1}{K} \sum_m \overset{\downarrow\downarrow}{W^\top}(m) [\overset{m}{V} \circ \overset{m}{U}^{\circ(\beta-2)}] + \frac{\lambda_h \sqrt{I_h}}{R(H, I_h)}}{\left[\frac{\|H\|_{1_c}}{\|H\|_{2_c}} \circ H + \|H\|_{2_c}\right]}{\frac{1}{K} \sum_m \overset{\downarrow\downarrow}{W^\top}(m) [\overset{m}{U}^{(\beta-1)}] + \frac{\lambda_h}{R(H, I_h)} [I_h H + \|H\|_{1_c}]},$$

where $\circ$ denotes element-wise multiplication (Hadamard product) and where the operators $\|\cdot\|_{p_r}$ and $\|\cdot\|_{p_c}$ indicate the matrices containing the norms per row and column, respectively, such that $$\|W\|_{p_r} = \begin{bmatrix} \|w_1\|_p \\ \vdots \\ \|w_K\|_p \end{bmatrix} 1_{I \times 1}^\top \qquad (15)$$

$$\|H\|_{p_c} = 1_{I \times 1} [\|h_1\|_p \ \ldots \ \|h_N\|_p]$$

with $w_k$ being the k-th row of W and $h_n$ the n-th column of H.

Multichannel CNMF

Since the techniques presented are meant to be applied on speech and audio signals, which can have multiple channels, a multichannel extension to the β-CNMF can be used. Consider $\mathcal{V}$ to represent a set of C matrices each representing a channel of the input signal, $$\mathcal{V} = \{v_1 \ldots v_C\}, \qquad (16)$$

with each $V_c$ being a K×N matrix. The goal of the multi-channel CNMF is to find a single time-evolving dictionary W(m) that is convolved independently with each channel $\mathcal{H}(l)=\{H_1(l) \ldots H_C(l)\}$, a frequency-dependent multichannel coefficient matrix, to approximate.

$$V_c \simeq U_c = \sum_{l=0}^{L-1} \sum_{m=0}^{M-1} \overset{\downarrow\downarrow}{W}(m) \overset{\overrightarrow{m}}{H_c}(l). \tag{17}$$

To do so, a loss function that considers every channel having a common W(m) is defined as $$\mathcal{L}(\mathcal{V}, \mathcal{U}) = D_\beta(\mathcal{V} \| \mathcal{U}) + R_{\lambda_w, \lambda_h}(W, \mathcal{H}, I_w, I_h) \tag{18}$$

with $$D_\beta(\mathcal{V} \| \mathcal{U}) = \left\langle \frac{1}{KN} \sum_{k,n} d_\beta(v_{k,n}^{(c)} \| u_{k,n}^{(c)}) \right\rangle_c \tag{19}$$

and $$R_{\lambda_w, \lambda_h}(W, \mathcal{H}, I_w, I_h) = \lambda_w \frac{1}{K} R(W^\top, I_w) + \lambda_h \left\langle \frac{1}{N} R(H_c, I_h) \right\rangle_c \tag{20}$$

where $\langle \cdot \rangle_c$ denotes the average over the channels. The matrices W and $H_c$ are again the sums of all dictionaries and channel coefficient matrices. The corresponding update rules are $$W(m) \leftarrow \tag{21}$$

$$W(m) \circ \circ \frac{\left\langle \frac{1}{N} \sum_l \left[ \overset{\downarrow\uparrow}{V_c} \circ \overset{\downarrow\uparrow}{U_c}{}^{\circ(\beta-2)} \right] \overset{\overrightarrow{m}}{H_c^\top}(l) \right\rangle_c + \frac{\lambda_w \sqrt{I_w}}{R(W^\top, I_w)}}{\left\langle \frac{1}{N} \sum_l \left[ \overset{\downarrow\uparrow}{U_c}{}^{\circ(\beta-1)} \right] \overset{\overrightarrow{m}}{H_c^\top}(l) \right\rangle_c + \frac{\left[ \frac{\|W\|_{1_r}}{\|W\|_{2_r}} \circ W + \|W\|_{2_r} \right]}{R(W^\top, I_w)} [I_w W + \|W\|_{1_r}]},$$

$$H_c(l) \leftarrow$$

$$H_c(l) \circ \circ \frac{\frac{1}{K} \sum_m \overset{\downarrow\downarrow}{W^\top}(m) \left[ \overset{\overrightarrow{m}}{V_c} \circ \overset{\overrightarrow{m}}{U_c}{}^{\circ(\beta-2)} \right] + \frac{\lambda_h \sqrt{I_h}}{R(H_c, I_h)}}{\frac{1}{K} \sum_m \overset{\downarrow\downarrow}{W^\top}(m) \left[ \overset{\overrightarrow{m}}{U}{}^{\circ}_{(\beta-1)} \right] + \frac{\left[ \frac{\|H_c\|_{1_c}}{\|H_c\|_{2_c}} \circ H_c + \|H_c\|_{2_c} \right]}{R(H_c, I_h)} [I_h H_c + \|H_c\|_{1_c}]}.$$

It should be noted that, for non-zero $\lambda_w$ and $\lambda_h$, the update rule for the dictionary requires for convergence that $\mathcal{V} = \mathcal{U}$ and $\|W\|_{1_r} = \sqrt{I_w} \|W\|_{2_r}$, while the update rule for the c-th channel coefficient matrix only requires that $V_c = U_c$ and $\|H_c\|_{1_c} = \sqrt{I_h} \|H_c\|_{2_c}$ independently of other channels, which is consistent with the goal of the multichannel CNMF.

Multidictionary CNMF

An extension can also be made to a multidictionary β-CNMF to account for speech and audio signals that are produced by several sources. Consider a multichannel signal $\mathcal{V}$ being composed of contributions from S multichannel sources $$\mathcal{V} = \sum_{s=1}^{S} \mathcal{V}_s = \left\{ \sum_{s=1}^{S} V_{s,1} \ldots \sum_{s=1}^{S} V_{s,C} \right\}, \tag{22}$$

with $V_{s,c}$ being a K×N matrix representing the c-th channel of the s-th source signal. The multidictionary CNMF aims to factorize $\mathcal{V}$ into S time-dependent dictionaries $\{W_s(m)\}$ that are convolved independently with each channel in their corresponding frequency-dependent multichannel coefficient matrices $\{\mathcal{H}_s(l)\}$ to approximate $$V_{s,c} \simeq U_{s,c} = \sum_{l=0}^{L-1} \sum_{m=0}^{M-1} \overset{\downarrow\downarrow}{W_s}(m) \overset{\overrightarrow{m}}{H_{s,c}}(l). \tag{23}$$

Each source can be factorized using different $I_s$. To do so, a loss function that considers every channel having a common $W_s(m)$ is defined as $$\mathcal{L}(\mathcal{V}, \mathcal{U}) = D_\beta(\mathcal{V} \| \mathcal{U}) + \left\langle R_{\lambda_{w_s}, \lambda_{h_s}}(W_s, \mathcal{H}_s, I_{w_s}, I_{h_s}) \right\rangle_s \tag{24}$$

with $$D_\beta(\mathcal{V} \| \mathcal{U}) = \left\langle \frac{1}{KN} \sum_{k,n} d_\beta(v_{k,n}^{(c)} \| u_{k,n}^{(c)}) \right\rangle_c \tag{25}$$

and $$R_{\lambda_{w_s}, \lambda_{h_s}}(W_s, \mathcal{H}_s, I_{w_s}, I_{h_s}) = \lambda_{w_s} \frac{1}{K} R(W_s^\top, I_{w_s}) + \lambda_{h_s} \left\langle \frac{1}{N} R(H_{s,c}, I_{h_s}) \right\rangle_c \tag{26}$$

where $\langle \cdot \rangle_s$ and $\langle \cdot \rangle_c$ denote the average over the sources and channels, respectively. The matrices $W_s$ and $H_{s,c}$ are again the sums of all dictionaries and channel coefficient matrices per source $$W_s = \sum_{m=0}^{M-1} W_s(m), \tag{27}$$

$$H_{s,c} = \sum_{l=0}^{L-1} H_{s,c}(l).$$

It should be noted that each source can be treated differently through the loss function by appropriately selecting $\lambda_{w_s}$, $I_{w_s}$, $\lambda_{h_s}$ and $I_{h_s}$. The corresponding update rules are $$W_s(m) \leftarrow W_s(m) \circ \circ \tag{28}$$

$$\frac{\left\langle \frac{1}{N} \sum_l \left[ \overset{\downarrow\uparrow}{V_c} \circ \overset{\downarrow\uparrow}{U_c}{}^{\circ(\beta-2)} \right] \overset{\overrightarrow{m}}{H_{s,c}^\top}(l) \right\rangle_c + \frac{\lambda_{w_s} \sqrt{I_{w_s}}}{R(W_s^\top, I_{w_s})}}{\left\langle \frac{1}{N} \sum_l \left[ \overset{\downarrow\uparrow}{U_c}{}^{\circ(\beta-1)} \right] \overset{\overrightarrow{m}}{H_{s,c}^\top}(l) \right\rangle_c + \frac{\left[ \frac{\|W_s\|_{1_r}}{\|W_s\|_{2_r}} \circ W_s + \|W_s\|_{2_r} \right]}{R(W_s^\top, I_{w_s})} [I_{w_s} W_s + \|W_s\|_{1_r}]},$$

-continued $$H_{s,c}(l) \leftarrow H_{s,c}(l) \circ \circ$$

$$\frac{\frac{1}{K}\sum_m W_s^{\top}(m)\left[\frac{m}{V_c} \circ \frac{m \circ (\beta-2)}{U_c}\right] + \frac{\lambda_{h_s}\sqrt{I_{h_s}}}{R(H_{s,c}, I_{h_s})}\left[\frac{\|H_{s,c}\|_{1_c}}{\|H_{s,c}\|_{2_c}} \circ H_{s,c} + \|H_{s,c}\|_{2_c}\right]}{\frac{1}{K}\sum_m W_s^{\top}(m)[\overline{U}_c^{(\beta-1)}] + \frac{\lambda_{h_s}}{R(H_{s,c}, I_{h_s})}\left[I_{h_s}H_{s,c} + \|H_{s,c}\|_{1_c}\right]},$$

where each of the channels in the original sources is estimated by weighting the hidden components as $$V_{s,c} = \frac{U_{s,c}}{\sum_{d=1}^{S} U_{d,c}} \circ V_c. \quad (29)$$

Multilayer CNMF

It is also proposed here to extend the CNMF to a multilayer CNMF for applications such as speech enhancement. In the multilayer approach, the representation from the previous (lower) layer is factorized further into a higher layer dictionary and a new representation.

A motivation for using the multilayer CNMF is to be more discriminant with each higher layer, so that any potential leakage that can occur due to similarity of the source signals in one layer can be reduced in the next higher layer by employing a different dictionary for a different representation.

The multilayer CNMF can be implemented in different topologies, as described below.

Multilayer CNMF—Topology 1

Figure 4A:
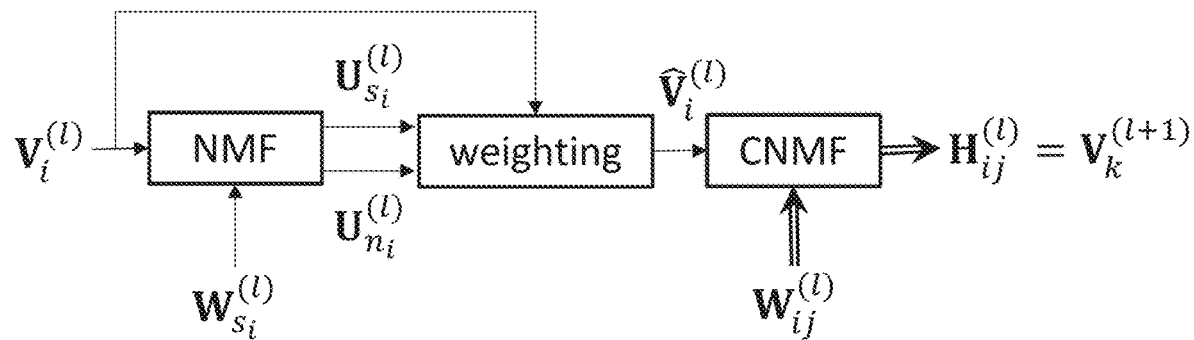
FIG. 4a is a block diagram illustrating forward analysis and inverse synthesis according to a first topology disclosed herein.
Figure 4A:
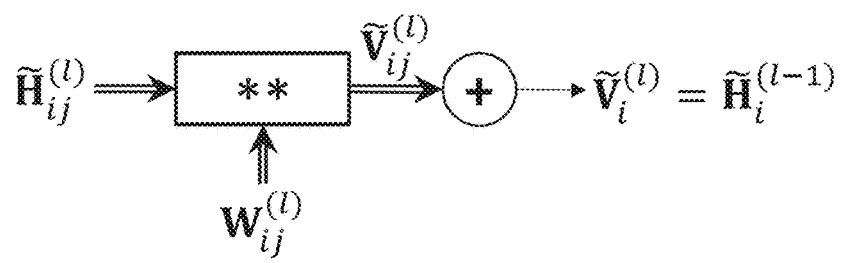

FIG. 4a is a block diagram illustrating multilayer CNMF according to a first topology, which proceeds as follows. It is assumed that the dictionaries $W_{s_j}^{(l)}$ and $W_{ij}^{(l)}$ for all layers l are pre-trained in advance and are accessible.

The bottom layer (l=0) takes as input a non-negative representation of the audio signal in the form of a matrix $V_1^{(0)}$. First (Step 1), $V_1^{(0)}$ is factorized using (non-convolutional) NMF and the bottom layer dictionary $W_{s_1}^{(0)}$, and separated into a signal matrix $U_{s_1}^{(0)}$ and a noise matrix $U_{n_1}^{(0)}$ that approximate, respectively, the desired content and the undesired content of the input audio signal. Next (Step 2), the representation of the desired content is enhanced in a weighting step, where the approximated signal and noise matrices are used. Next (Step 3), a new factorization of the enhanced audio signal representation $\hat{V}_1^{(0)}$ is obtained using 2D CNMF, and the output from the bottom layer is obtained as the coefficient matrices of the factorization of $\hat{V}_1^{(0)}$.

The bottom layer forward analysis is summarized below, where (**) denotes 2D convolution.

Bottom layer (l = 0)
In:   I = 1 matrix $V_1^{(0)}$

Step 1: $V_1^{(0)} \cong \underbrace{W_{s_1}^{(0)} \cdot H_{s_1}^{(0)}}_{U_{s_1}^{(0)}} + \underbrace{W_{n_1}^{(0)} \cdot H_{n_1}^{(0)}}_{U_{n_1}^{(0)}}$ (NMF)

Step 2: $\hat{V}_1^{(0)} = \frac{U_{s_1}^{(0)}}{U_{s_1}^{(0)} + U_{n_1}^{(0)}} \cdot V_1^{(0)}$ (weighting)

Step 3: $\hat{V}_1^{(0)} \cong \Sigma_j^{I^{(0)}} W_{1,j}^{(0)} ** H_{1,j}^{(0)}$ (2D CNMF)
Out:   I · I$^{(0)}$ = I$^{(0)}$ matrices $H_k^{(0)} = H_{1,j}^{(0)}$, j = k = 1, 2, . . . , I$^{(0)}$ One or more middle layers (l=1, 2, . . . , L−1) take as input the coefficient matrices from the preceding lower layer as input, and perform a similar procedure as the bottom layer but operating on the input coefficient matrices and using respective higher layer dictionaries $W_{s_i}^{(l)}$ and $W_{ij}^{(l)}$.

The middle layer(s) forward analysis is summarized below.

Middle layers (l = 1, 2, . . . , L − 1)
In:   I = $\Pi_{p=0}^{l-1} I^{(p)}$ matrices $H_i^{(l-1)}$, i = 1, 2, . . . , I
For i = 1, 2, . . . , I:
Step 1:   $V_i^{(l)} = H_i^{(l-1)}$ Step 2: $V_i^{(l)} \cong \underbrace{W_{s_i}^{(l)} \cdot H_{s_i}^{(l)}}_{U_{s_i}^{(l)}} + \underbrace{W_{n_i}^{(l)} \cdot H_{n_i}^{(l)}}_{U_{n_i}^{(l)}}$ (NMF)

Step 3: $\hat{V}_i^{(l)} = \frac{U_{s_i}^{(l)}}{U_{s_i}^{(l)} + U_{n_i}^{(l)}} \cdot V_i^{(l)}$ (weighting)

Step 4: $\hat{V}_i^{(l)} \cong \Sigma_j^{I^{(l)}} W_{ij}^{(l)} ** H_{ij}^{(l)}$ (2D CNMF)
Out:   I · I$^{(l)}$ = $\Pi_{p=0}^{l} I^{(p)}$ matrices $H_k^{(l)}$, k = 1, 2, . . . , $\Pi_{p=0}^{l} I^{(p)}$
       $H_k^{(l)} = H_{ij}^{(l)}$, i = 1, 2, . . . , I, j = 1, 2, . . . , I$^{(l)}$,
       k = (i − 1) · I + j The top layer (l=L) is similar to a middle layer, except that Step 4 of a middle layer is omitted and the output corresponds to $\pi_{p=0}^{L-1} I^{(p)}$ matrices $\hat{V}_i^{(L)}$ from Step 3.

Extraction of the enhanced signal is then obtained by inverse synthesis as follows.

In the inverse synthesis, the top layer (l=L) corresponds to a reduced middle layer (see below), wherein Step 1 is omitted and the output corresponds to $\pi_{p=0}^{L-1} I^{(p)}$ matrices $\hat{V}_i^{(L)}$ from the analysis.

In each middle layer (l=1, 2, . . . , L−1), coefficient matrices obtained from the next higher layer are taken as input and an intermediate signal representation $\hat{V}_i^{(l)}$ is derived (Step 1) using these coefficient matrices and the dictionary corresponding to the respective layer. The intermediate signal representation is then taken (Step 2) as the coefficient matrices for the next lower layer.

The middle layer algorithm for the inverse synthesis is summarized below.

Middle layers (l = L − 1, ... , 1)
In:   $\Pi_{p=0}^{l} I^{(p)} = I \cdot I^{(l)}$ matrices $\tilde{H}_k^{(l)}$, k = 1, 2, ... , I · I$^{(l)}$
      $\tilde{H}_{ij}^{(l)} = \tilde{H}_k^{(l)}$, i = 1, 2, ... , I, j = 1, 2, ... , I$^{(l)}$, k = (i − 1) · I + j
For i = 1, 2, ... , I:
Step 1:   $\tilde{V}_i^{(l)} = \Sigma_j^{I^{(l)}} W_{ij}^{(l)} ** \tilde{H}_{ij}^{(l)}$ (2D CNMF)
Step 2:   $\tilde{H}_i^{(l-1)} = \tilde{V}_i^{(l)}$
Out:   I = $\Pi_{p=0}^{l-1} I^{(p)}$ matrices $\tilde{H}_i^{(l-1)}$, i = 1, 2, ... , I In the bottom layer (l=0), the enhanced signal representation $\hat{V}_1^{(0)}$ is obtained from the bottom layer dictionaries $W_{1,j}^{(0)}$ and the coefficient matrices $\hat{H}_{1,j}^{(0)}$ derived in the next higher layer.

The bottom layer algorithm for the inverse synthesis is summarized below.

Bottom layer (l = 0)
In:  $I^{(0)} = 1 \cdot I^{(0)}$ matrices $H_{1,j}^{(0)} = H_k^{(0)}$, $j = k = 1, 2, \ldots, 1 \cdot I^{(0)}$
Step 1:  $\tilde{V}_1^{(0)} = \Sigma_j^{I^{(0)}} W_{1,j}^{(0)} ** \tilde{H}_{1,j}^{(0)}$  (2D CNMF)
Out:  I = 1 matrix $\tilde{v}_1^{(0)}$ Multilayer CNMF—Topology 2

Figure 4B:
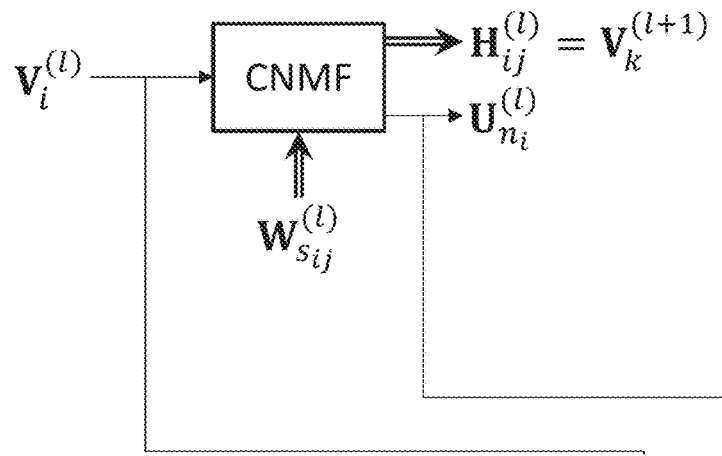
FIG. 4b is a block diagram illustrating forward analysis and inverse synthesis according to a second topology disclosed herein.
Figure 4B:
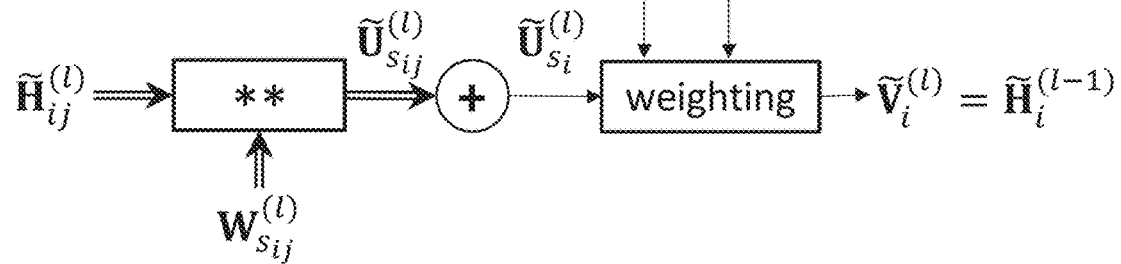

One potential problem of Topology 1 is that the final reconstruction is not guaranteed to be part of the first separation stage but an approximation of it. Topology 2 attempts to overcome this problem by directly using CNMF on the input matrices in each layer, rather than the weighted approximations as in Topology 1. FIG. 4b is a block diagram illustrating this second topology. It is again assumed that the dictionaries and $W_{s_i}^{(l)}$ and $W_{ij}^{(l)}$ for all layers l are pre-trained in advance and are accessible.

In each layer, the input matrix $V_i^{(l)}$ and a corresponding residual noise matrix $U_{n_i}^{(l)}$ are stored for subsequent use in the inverse synthesis, and the coefficient matrices $H_k^{(l)}$ are passed to the next higher layer for refined processing using higher layer dictionaries. In this topology, the top layer (l=L) is not different from a middle layer, and the output is comprised of $\pi_{p=0}^{L} I^{(p)}$ coefficient matrices $H_k^{(L)}$ for the top layer.

The forward analysis of Topology 2 is summarized below.

Bottom layer (l = 0)
In:  I = 1 matrix $V_1^{(0)}$

Step 1:  $V_1^{(0)} \cong \underbrace{\Sigma_j^{I^{(0)}} W_{1,j}^{(0)} ** H_{1,j}^{(0)}}_{U_{s_1}^{(0)}} + U_{n_1}^{(0)}$  (2D CNMF)

Store $V_1^{(0)}$, $U_{n_1}^{(0)}$
Out:  $I \cdot I^{(0)} = I^{(0)}$ matrices $H_k^{(0)} = H_{1,j}^{(0)}$, $j = k = 1, 2, \ldots, I^{(0)}$
Middle layers (l = 1, 2, ..., L − 1)
In:  $I = \Pi_{p=0}^{l-1} I^{(p)}$ matrices $H_i^{(l-1)}$, $i = 1, 2, \ldots, I$
For i = 1, 2, ..., I:
  Step 1:  $V_i^{(l)} = H_i^{(l-1)}$ Step 2:  $V_i^{(l)} \cong \underbrace{\Sigma_j^{I^{(l)}} W_{ij}^{(l)} ** H_{ij}^{(l)}}_{U_{s_i}^{(l)}} + U_{n_i}^{(l)}$  (2D CNMF)

Store $V_i^{(l)}$, $U_{n_i}^{(l)}$
Out:  $I \cdot I^{(l)} = \Pi_{p=0}^{l} I^{(p)}$ matrices $H_k^{(l)}$, $k = 1, 2, \ldots, \Pi_{p=0}^{l} I^{(p)}$
  $H_k^{(l)} = H_{ij}^{(l)}$, $i = 1, 2, \ldots, I$, $j = 1, 2, \ldots, I^{(l)}$,
  $k = (i − 1) \cdot I + j$
Top layer (l = L)
  The top layer is equal to a middle layer and the output is comprised of $\Pi_{p=0}^{L} I^{(p)}$ matrices $H_k^{(L)}$.

The enhanced signal representation is then extracted by inverse synthesis as follows.

The top layer is equal to a middle layer, and the input are $\pi_{p=0}^{L} I^{(p)}$ matrices $H_k^{(L)}$ from the forward analysis. In each middle layer, the matrix $\tilde{U}_{s_i}^{(l)}$ is reconstructed (Step 1) from the corresponding dictionaries $W_{ij}^{(l)}$ and the coefficient matrices $\tilde{H}_{ij}^{(l)}$ from the next higher layer. Next (Step 2), an enhanced matrix $\tilde{V}_i^{(l)}$ at the respective layer is obtained by weighting using the matrix $V_i^{(l)}$ and the residual noise matrix $U_{n_i}^{(l)}$ from the forward analysis, together with the matrix $\tilde{U}_{s_i}^{(l)}$ reconstructed in Step 1. The enhanced matrix $\tilde{V}_i^{(l)}$ is then taken as the input to the next lower layer in the inverse synthesis. The procedure is repeated also at the bottom layer, which provides as output the enhanced signal representation $\tilde{V}_1^{(0)}$.

The inverse synthesis of Topology 2 is summarized below.

Top layer (l = L)
  The top layer is equal to a middle layer, whereby the input corresponds to $\Pi_{p=0}^{L} I^{(p)}$ matrices $H_k^{(L)}$ from the analysis.
Middle layers (l = L − 1, . . . , 1)
In:  $\Pi_{p=0}^{l} I^{(p)} = I \cdot I^{(l)}$ matrices $\tilde{H}_k^{(l)}$, $k = 1, 2, \ldots, I \cdot I^{(l)}$
  $\tilde{H}_{ij}^{(l)} = \tilde{H}_k^{(l)}$, $i = 1, 2, \ldots, I$, $j = 1, 2, \ldots, I^{(l)}$,
  $k = (i − 1) \cdot I + j$
For i = 1, 2, ..., I:
  Step 1:  $\tilde{U}_{s_i}^{(l)} = \Sigma_j^{I^{(l)}} W_{ij}^{(l)} ** \tilde{H}_{ij}^{(l)}$  (2D CNMF)

Step 2:  $\tilde{V}_i^{(l)} = \dfrac{\tilde{U}_{s_i}^{(l)}}{\tilde{U}_{s_i}^{(l)} + U_{n_i}^{(l)}} \cdot V_i^{(l)}$  (weighting)

Step 3:  $\tilde{H}_i^{(l-1)} = \tilde{V}_i^{(l)}$
Out:  $I = I = \Pi_{p=0}^{l-1} I^{(p)}$ matrices $\tilde{H}_i^{(l-1)}$, $i = 1, 2, \ldots, I$
Bottom layer (l = 0)
In:  $I^{(0)} = 1 \cdot I^{(0)}$ matrices $\tilde{H}_{1,j}^{(0)} = \tilde{H}_k^{(0)}$, $j = j = 1, 2, \ldots, 1 \cdot I^{(0)}$ Step 1:  $\tilde{U}_{s_1}^{(0)} \cong \Sigma_j^{I^{(0)}} W_{1,j}^{(0)} ** \tilde{H}_{1,j}^{(0)}$  (2D CNMF)

Step 2:  $\tilde{V}_1^{(0)} = \dfrac{\tilde{U}_{s_1}^{(0)}}{\tilde{U}_{s_1}^{(0)} + U_{n_1}^{(0)}} \cdot V_1^{(0)}$  (weighting)

Out:  I = 1 matrix $\tilde{V}_1^{(0)}$

Multilayer CNMF—Topology 3

Figure 4C:
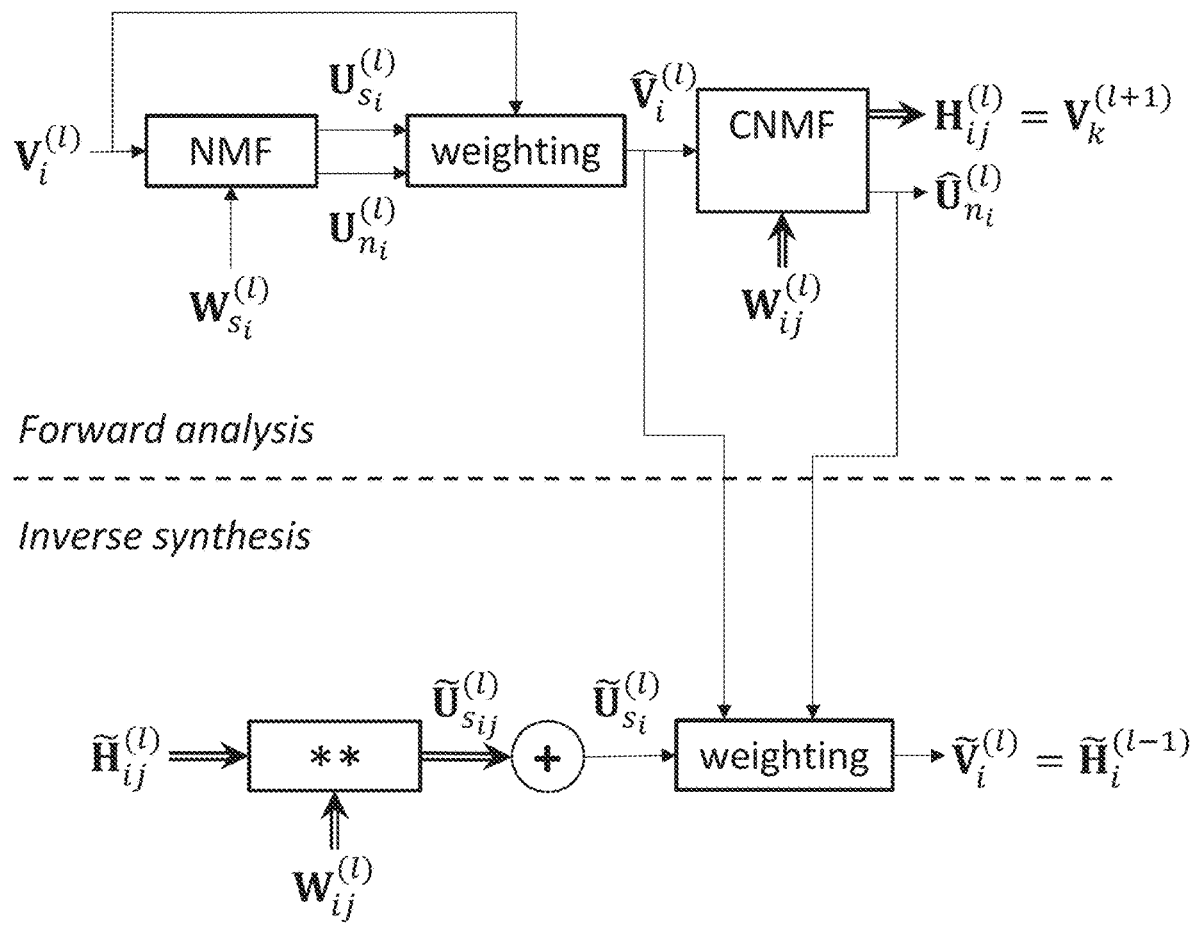
FIG. 4c is a block diagram illustrating forward analysis and inverse synthesis according to a third topology disclosed herein.

A third topology, as illustrated in the block diagram of FIG. 4c, is also proposed. This topology can be seen as a hybrid between Topology 1 and Topology 2. By first applying an NMF-based enhancement in each layer, leakage is reduced. The CNMF-based enhancement is then applied to the already "cleansed" signal representation, which represents the input for the next higher layer. There is less leakage because the operation is performed only on a part of the original input matrix and not on an approximation of it.

Using Topology 3, the forward analysis can be summarized as follows.

Bottom layer (l = 0)
In:  I = 1 matrix $V_1^{(0)}$

Step 1:  $V_1^{(0)} \cong \underbrace{W_{s_1}^{(0)} \cdot H_{s_1}^{(0)}}_{U_{s_1}^{(0)}} + \underbrace{W_{n_1}^{(0)} \cdot H_{n_1}^{(0)}}_{U_{n_1}^{(0)}}$  (NMF)

Step 2:  $\hat{V}_1^{(0)} = \dfrac{U_{s_1}^{(0)}}{U_{s_1}^{(0)} + U_{n_1}^{(0)}} \cdot V_1^{(0)}$  (weighting)

Step 3:  $\hat{V}_1^{(0)} \cong \underbrace{\Sigma_j^{I^{(0)}} W_{1,j}^{(0)} ** H_{1,j}^{(0)}}_{\hat{U}_{s_1}^{(0)}} + \hat{U}_{n_1}^{(0)}$  (2D CNMF)

Store $\hat{V}_1^{(0)}$, $\hat{U}_{n_1}^{(0)}$
Out:  $I \cdot I^{(0)} = I^{(0)}$ matrices $H_k^{(0)} = H_{1,j}^{(0)}$, $j = k = 1, 2, \ldots, I^{(0)}$
Middle layers (l = 1, 2, ..., L − 1)
In:  $I = \Pi_{p=0}^{l-1} I^{(p)}$ matrices $H_i^{(l-1)}$, $i = 1, 2, \ldots, I$
For i = 1, 2, ..., I:

Step 1:  $V_i^{(l)} = H_i^{(l-1)}$

Step 2:  $V_i^{(l)} \cong \underbrace{W_{s_i}^{(l)} \cdot H_{s_i}^{(l)}}_{U_{s_i}^{(l)}} + \underbrace{W_{n_i}^{(l)} \cdot H_{n_i}^{(l)}}_{U_{n_i}^{(l)}}$  (NMF)

Step 3:  $\hat{V}_i^{(l)} = \dfrac{U_{s_i}^{(l)}}{U_{s_i}^{(l)} + U_{n_i}^{(l)}} \cdot V_i^{(l)}$  (weighting)

-continued

Step 4: $\hat{V}_i^{(l)} \cong \underbrace{\Sigma_j^{I^{(l)}} W_{ij}^{(l)} ** H_{ij}^{(l)}}_{\hat{U}_{s_i}^{(l)}} + \hat{U}_{n_i}^{(l)}$ (2D CNMF)

Store $\hat{V}_i^{(l)}, \hat{U}_{n_i}^{(l)}$
Out: $I \cdot I^{(l)} = \Pi_{p=0}{}^l I^{(p)}$ matrices $H_k^{(l)}$, $k = 1, 2, \ldots, \Pi_{p=0}{}^l I^{(p)}$
$H_k^{(l)} = H_{ij}^{(l)}$, $i = 1, 2, \ldots, I$, $j = 1, 2, \ldots, I^{(l)}$, $k = (i - 1) \cdot I + j$
Top layer ($l = L$)
  The top layer is equal to a middle layer and the output is comprised of $\Pi_{p=0}{}^L I^{(p)}$ matrices $H_k^{(L)}$.

The corresponding inverse synthesis can be summarized as follows.

Top layer ($l = L$)
  The top layer is equal to a middle layer, whereby the input is comprised of $\Pi_{p=0}{}^L I^{(p)}$ matrices $H_k^{(L)}$ from the analysis.
Middle layers ($l = L - 1, \ldots, 1$)
  In: $\Pi_{p=0}{}^l I^{(p)} = I \cdot I^{(l)}$ matrices $\tilde{H}_k^{(l)}$, $k = 1, 2, \ldots, I \cdot I^{(l)}$
  $\tilde{H}_{ij}^{(l)} = \tilde{H}_k^{(l)}$, $i = 1, 2, \ldots, I$, $j = 1, 2, \ldots, I^{(l)}$, $k = (i - 1) \cdot I + j$
  For $i = 1, 2, \ldots, I$:
    Step 1: $\tilde{U}_{s_i}^{(l)} = \Sigma_j^{I^{(l)}} W_{ij}^{(l)} ** \tilde{H}_{ij}^{(l)}$ (2D CNMF)
    Step 2: $\tilde{V}_i^{(l)} = \dfrac{\tilde{U}_{s_i}^{(l)}}{\hat{U}_{s_i}^{(l)} + \hat{U}_{n_i}^{(l)}} \cdot \hat{V}_i^{(l)}$ (weighting)
    Step 3: $\tilde{H}_i^{(l-1)} = \tilde{V}_i^{(l)}$
  Out: $I = \Pi_{p=0}{}^{l-1} I^{(p)}$ matrices $\tilde{H}_i^{(l-1)}$, $i = 1, 2, \ldots, I$
Bottom layer ($l = 0$)
  In: $I^{(0)} = 1 \cdot I^{(0)}$ matrices $H_{1,j}^{(0)} = H_k^{(0)}$, $j = k = 1, 2, \ldots, 1 \cdot I^{(0)}$
  Step 1: $\tilde{U}_{s_1}^{(0)} \cong \Sigma_j^{I^{(0)}} W_{1,j}^{(0)} ** \tilde{H}_{1,j}^{(0)}$ (2D CNMF)
  Step 2: $\tilde{V}_1^{(0)} = \dfrac{\tilde{U}_{s_1}^{(0)}}{\hat{U}_{s_1}^{(0)} + \hat{U}_{n_1}^{(0)}} \cdot \hat{V}_1^{(0)}$ (weighting)
  Out: $I = 1$ matrix $\tilde{V}_1^{(0)}$ Application to Speech and Audio In the following, experiments are presented in which the new variants of CNMF described above are applied to speech and audio signals.

The input multichannel matrix to the algorithms is obtained by using the short-time Fourier transform (STFT) channel-wise and keeping only half of the magnitude spectrum. The coded or separated signals are reconstructed using the original multichannel phase of the input multichannel matrix when performing the inverse STFT to obtain the time-domain signal. In the experiments, all audio signals are sampled at 48 kHz. For simplicity, only a single channel is shown in the plots.

Speech Coding

As explained above, the algorithm factorizes a K×N matrix V into a sum of I convolutions of K×M matrices $\{W_L\}$ and L×N matrices $\{H_L\}$ such that I<min(K, N). The question thus arises how to select I, M and L in equation (17) to obtain a good approximation while reducing the total number of matrix elements, and how $\beta$, $\lambda_w$, $\lambda_h$, $I_w$ and $I_h$ should be chosen, so that the reduction of bases in W and their activations in H result in a perceptually good reconstruction.

Figure 5:
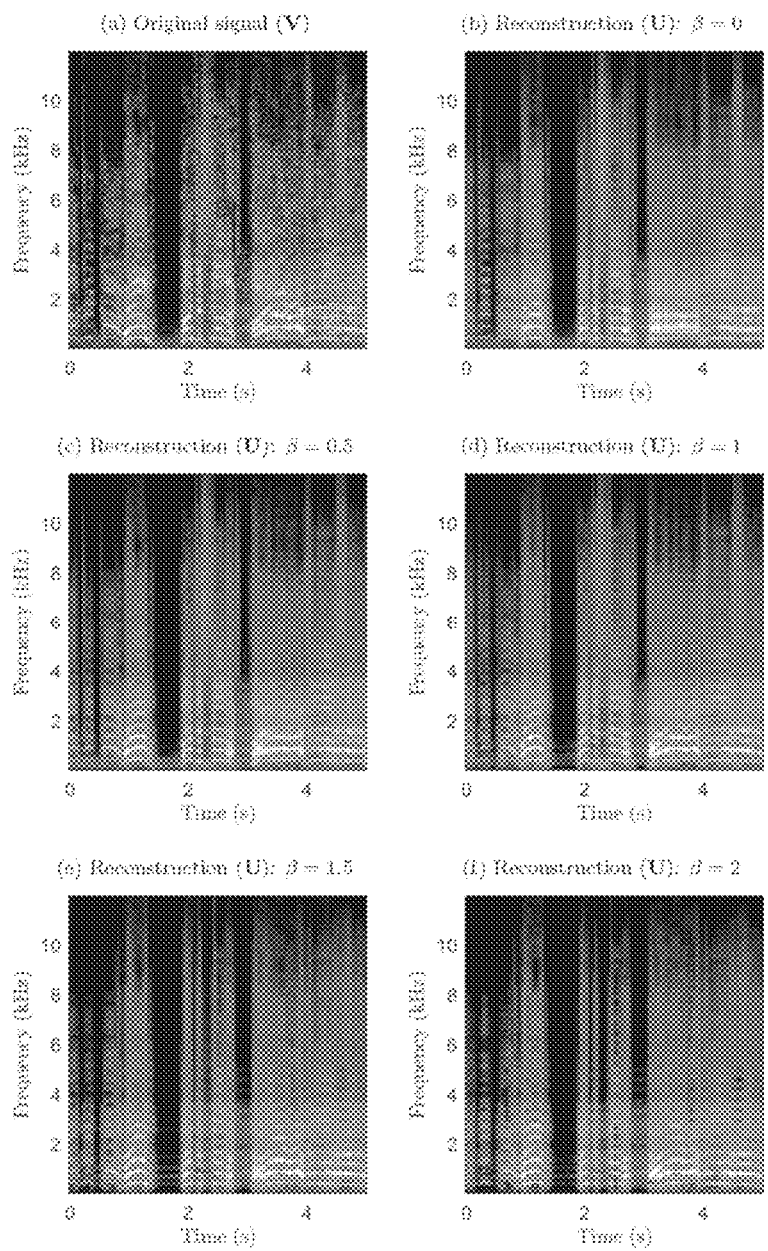
FIG. 5 shows time/frequency spectrograms illustrating the behavior of $\beta$-CNMF for different $\beta$-parameters.

The first experiments with the $\beta$-CNMF are to determine the best without enforcing sparsity. So, to explore the behavior of the $\beta$-CNMF with respect to different $\beta$-parameters, a speech item was factorized using I=8 bases without convolution (M=L=1). The results are shown in FIG. 5. It can be seen that the $\beta$-parameter defines the importance of the elements in V, since a small value (e.g. 0.5) will focus more on the weak components, which in speech and audio is the high-frequency content, while a large value (e.g. 2) gives priority to strong components, i.e. the low frequencies. It can be noted how the choice of $\beta$=0 seems to give equal importance to weak and strong components. This is due to the scale-variance of the $\beta$-divergence, i.e.

$$d_\beta(\upsilon\|u) = \upsilon^\beta d_\beta\left(1\|\tfrac{u}{\upsilon}\right).$$

Hence, when $\beta>0$ the strong components produce a larger divergence while the weak produce a smaller; the opposite is happening when $\beta<0$. The only scale-invariant case is for $\beta=0$ (Itakura-Saito divergence). Since all reconstructions are optimal with respect to the chosen $\beta$, the signal-to-noise ratio (SNR) cannot be used as a measure of quality. The reason for this is that a higher SNR is obtained when $\beta=2$ because the algorithm minimizes the power of the error. Therefore, the decision for selecting the "best" $\beta$-parameter was done by listening to each of the reconstructions. The parameter that perceptually gave the best reconstruction was between $\beta=0.5$ and $\beta=0.7$.

To estimate the true rank I of the factorization, several experiments were carried out on a mono speech item. The value I=64 was estimated for a perceptually good reconstruction. A more formal way was also developed using a singular value decomposition (SVD). Applying the SVD to V, the number of orthogonal/independent components required to represent a certain percentage of the matrix' energy is estimated, and this number is chosen as the value of I. The first trial was set to represent 90% of the energy, leading to I<64 and a perceptually poor reconstruction. Therefore, the energy percentage was raised to 95%, leading to I=84, which resulted in a perceptually good reconstruction.

Figure 6:
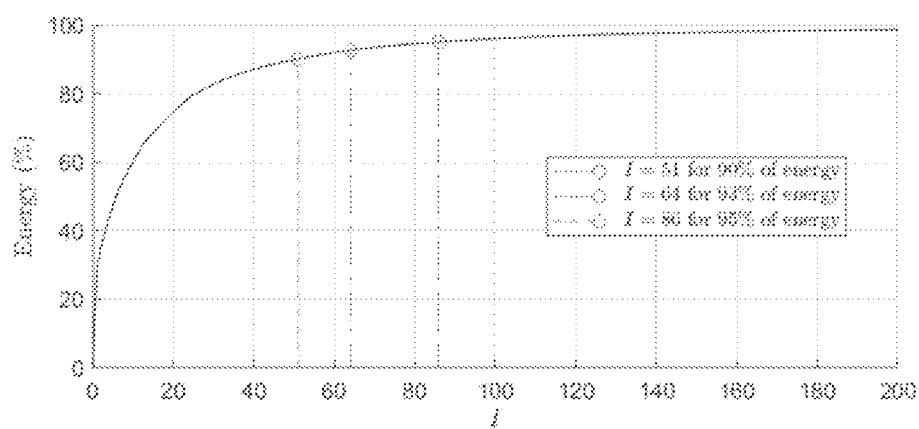
FIG. 6 is a graph illustrating how much energy is retained after factorization of an input signal as a function of the rank I of the factorization.

To generalize the rank estimation using the SVD, a training set of 16 multichannel speech items was used. First, the items were mixed down to mono and the SVD was performed on each of their non-negative representations, giving I∈[37,88]. Then, these matrices were concatenated into a single big matrix and the SVD was applied again, giving now I=85. Finally, a multichannel non-negative representation was obtained for each item and then all these matrices were treated as independent files and stacked into a single big matrix. When the SVD was used on this matrix, the resulting rank for 95% of energy preservation was determined as I=86, as illustrated in FIG. 6. It can be noted that the change of number of bases for I>40 does not significantly increase the amount of preserved energy. This can be interpreted as having those extra bases represent the frequency details in the spectrogram which do not contribute greatly to the total amount of energy of a signal, but rather increase the fine detail of speech.

The procedure for choosing I is summarized in Table 1 below, including some characteristics of the training items. It can be noted that the rank estimation seems to be independent of the language, number of channels, and duration. It can be seen in this table that the total number of bases for two concatenated items is not equal to the sum of the bases required for each one independently. This suggests that the dictionary that represents this set contains bases that are representative of speech in general and bases that may be more focused on specific details of each item.

TABLE 1

Rank estimation from training set to preserve 95% of energy

| Item | Language | Channels | Duration | Frames | Rank |
|---|---|---|---|---|---|
| 1 | English | 2 | 01:53:32 | 159,679 | 88 |
| 2 | English | 1 | 00:02:58 | 4,181 | 50 |
| 3 | Chinese | 1 | 00:03:08 | 4,412 | 41 |
| 4 | Spanish | 1 | 00:03:08 | 4,412 | 37 |
| 5 | English | 1 | 00:00:45 | 1,059 | 83 |
| 6 | English | 2 | 00:04:02 | 5,675 | 58 |
| 7 | English | 1 | 00:06:35 | 9,259 | 64 |
| 8 | English | 1 | 00:06:35 | 9,259 | 53 |
| 9 | English | 1 | 00:06:35 | 9,259 | 64 |
| 10 | English | 1 | 00:00:52 | 1,235 | 47 |
| 11 | English | 1 | 00:04:39 | 6,552 | 44 |
| 12 | Spanish | 1 | 00:04:39 | 6,552 | 48 |
| 13 | Chinese | 1 | 00:04:39 | 6,552 | 52 |
| 14 | English | 1 | 00:04:57 | 6,966 | 80 |
| 15 | English | 1 | 00:04:57 | 6,966 | 87 |
| 16 | English | 2 | 00:00:14 | 330 | 50 |
| Mono mix (16 items) | | | 02:52:19 | 242,348 | 85 |
| Multichannel mix (19 items) | | | 04:50:08 | 408,032 | 86 |

For the selection of M, the time lag of the dictionary, several experiments were conducted on a mono item. When M was increased while the other parameters were fixed, the approximation improved slightly while the computational load increased significantly. Therefore, M=1 was fixed in all the following experiments, so in the experiments described below "CNMF" means convolution only in frequency.

When applying the CNMF, the rank of the factorization depends on the number of bases I and the frequency lag parameter L of the coefficient matrix. If these parameters are chosen such that their multiplication is equal to the number of rows in V, i.e. IL=K, the resulting factors will be $w_{ki}=\delta(k-Li)$ and $h_{in}(l)=v_{kn}\delta(k-Li-l)$ for i=0, ..., I−1. So, in this case perfect reconstruction is achieved. Therefore, for a low-rank factorization that exploits the frequency behavior of V, the number of bases and the frequency lag parameter of the coefficient matrix should be chosen as IL<K. For speech signals, a good assumption is to choose L such that it covers a frequency range corresponding to at least the fundamental frequency of the pitch.

Figure 7:
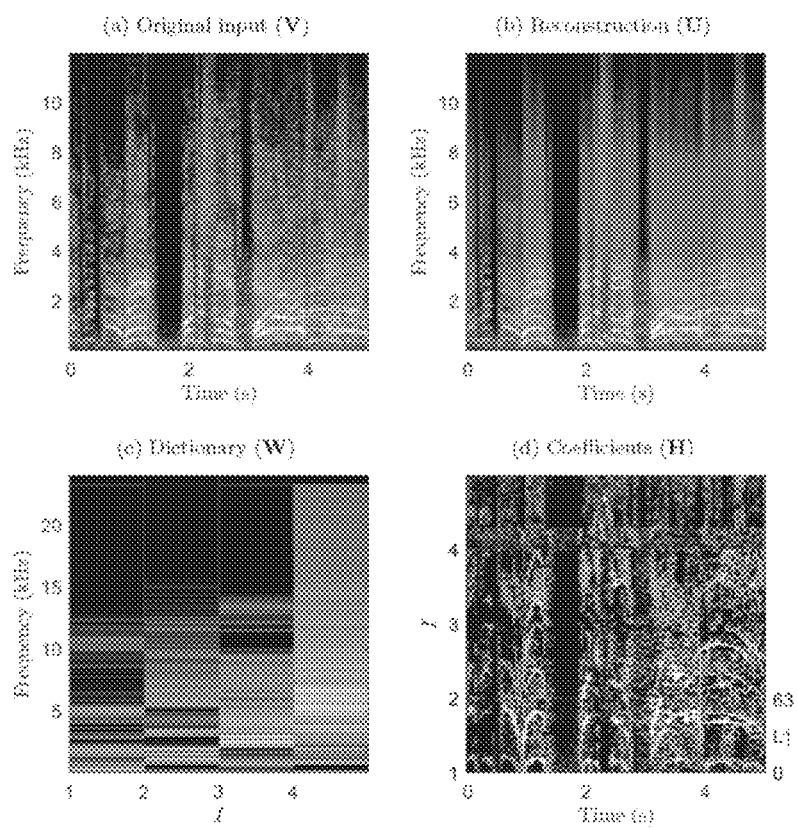
FIG. 7 shows time/frequency spectrograms for a CNMF process applied to speech.
Figure 8:
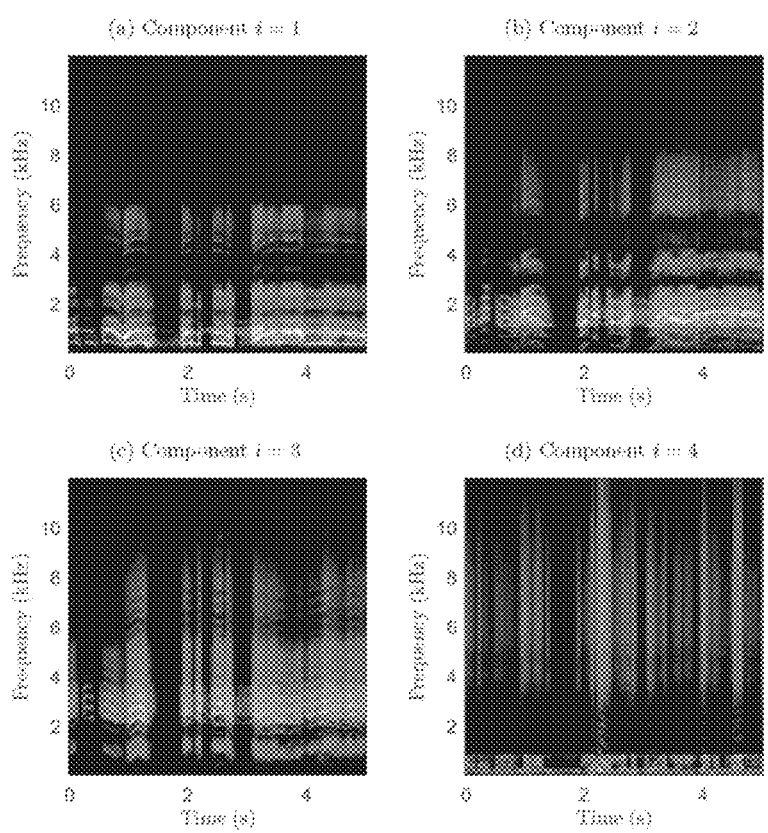
FIG. 8 shows independently reconstructed time/frequency spectrograms for the four components of the CNMF process illustrated in FIG. 7.

An example of the CNMF applied to speech is shown in FIG. 7. There it can be seen that the reconstruction error due to the low-rank factorization is present as a blurring effect along the frequency axis. This blurring can be compared to a decrease in frequency resolution, as if the STFT was sampling the frequency axis on IL bins instead of K. Note that the energy of the first three basis vectors is concentrated around a certain frequency while for the last basis vector it is spread across all frequencies. Analogously, the first three coefficient matrices look very similar while no clear structure can be seen in the last one. The first three basis vectors suggest that the signal has a similar structure in different frequency ranges, which is expected from a tonal signal such as speech (upper harmonics). The last basis vector represents the components in the signal that are spread in the whole frequency range, which in speech are fricative sounds. This can be seen more clearly in FIG. 8, where each one of the I components that form the approximation matrix U was reconstructed independently.

Speech Enhancement

Figure 9:
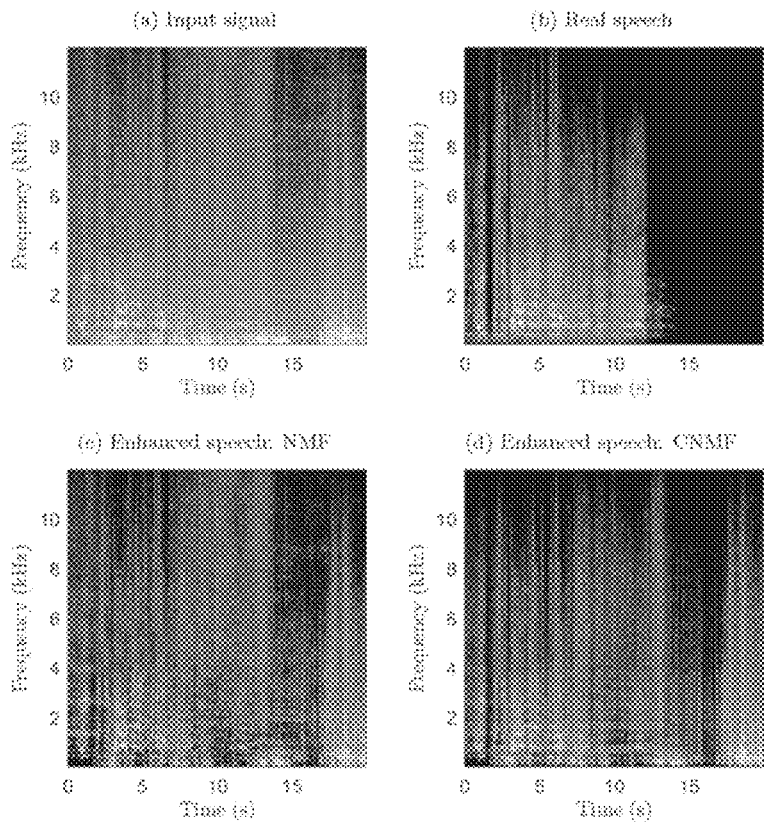
FIG. 9 shows time/frequency spectrograms illustrating speech enhancement using multidictionary $\beta$-CNMF.

The first experiments on speech enhancement were carried out on a multichannel audio signal. This signal was produced by adding music and effects to a speech signal. Two dictionaries were trained on the speech signal. The first dictionary was trained using the "best" parameters explored above: $\beta=0.5$, I=86 and a non-convolutional model, i.e. M=L=1. The second dictionary was trained using the same $\beta$-parameter and a convolutional model with I=4, M=1 and L=32. Then, speech enhancement was performed on the audio signal by using the multidictionary $\beta$-CNMF with a fixed speech dictionary and an adaptive noise dictionary. The result of this procedure is shown in FIG. 9 for each of the two trained dictionaries. Note that there is a greater separation in the low-frequencies when the speech dictionary was trained using NMF. On the contrary, the CNMF-based dictionary led to a better separation on the high-frequencies. Perceptually, the enhanced speech obtained with the non-convolutional dictionary sounded slightly better than the enhanced speech using the convolutional dictionary.

Figure 10:
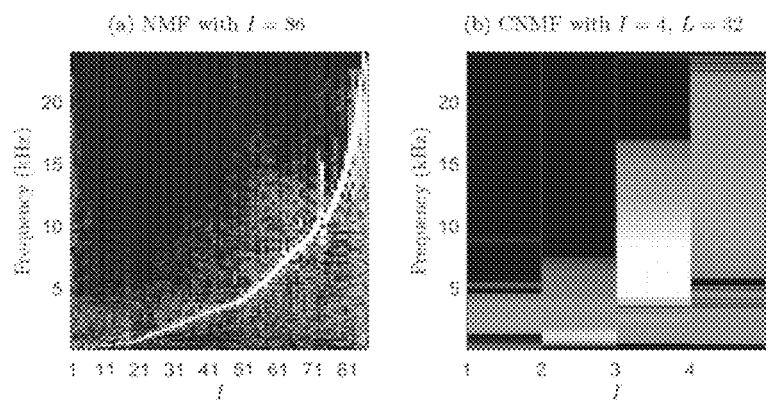
FIG. 10 illustrates trained dictionaries for an example presented herein.

To validate these results in a general setting, the speech dictionaries were retrained using the set of items listed in Table 1 above. First, the multi-channel representations of the items were concatenated channel-wise, obtaining a single multichannel representation with 19 channels. Then, the multichannel $\beta$-CNMF was applied twice on this representation using NMF and CNMF with the same parameters as before. These dictionaries are shown in FIG. 10. Note how each basis vector in the non-convolutional dictionary focuses on a different fundamental frequency. The first basis vectors even show a harmonic structure, consistent with how voiced sounds in speech are usually modeled.

Figure 11:
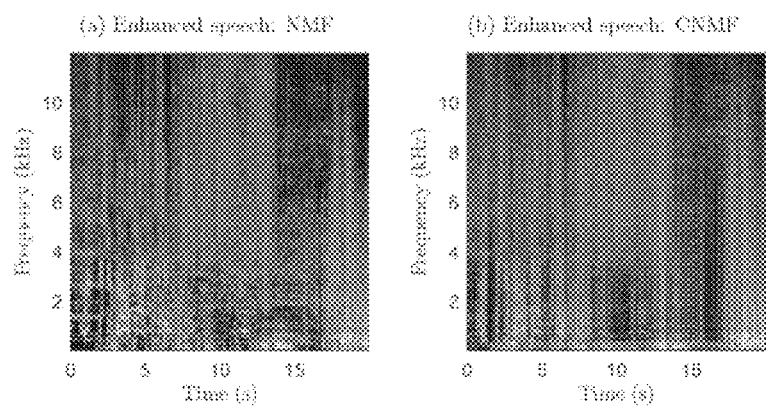
FIG. 11 shows time/frequency spectrograms representing enhanced speech using multidictionary $\beta$-CNMF and the dictionaries illustrated in FIG. 10.

The experiments were repeated with these dictionaries, leading to the results shown in FIG. 11. Note that the enhanced speech obtained with the NMF dictionary is similar to the one obtained when the dictionary was trained on the real speech. However, this is not the case for the CNMF dictionary, which led to more leakage from the noise signal to the enhanced speech than in the previous experiment. This is explained by the fact that the convolutional model has a greater modeling power and can represent other elements apart from those similar to the items in the training set. Perceptually, the reconstruction of the enhanced speech using the NMF dictionary sounded significantly better. Therefore, the NMF-based algorithm was preferred over the CNMF-based when performing speech enhancement.

It was also found in these experiments that, when no speech was present in the input signal, the algorithm could explain the observation using the speech dictionary, regardless of the training set. This was the case for the last seconds of the audio signal in these experiments, see FIG. 9(*b*).

Figure 12:
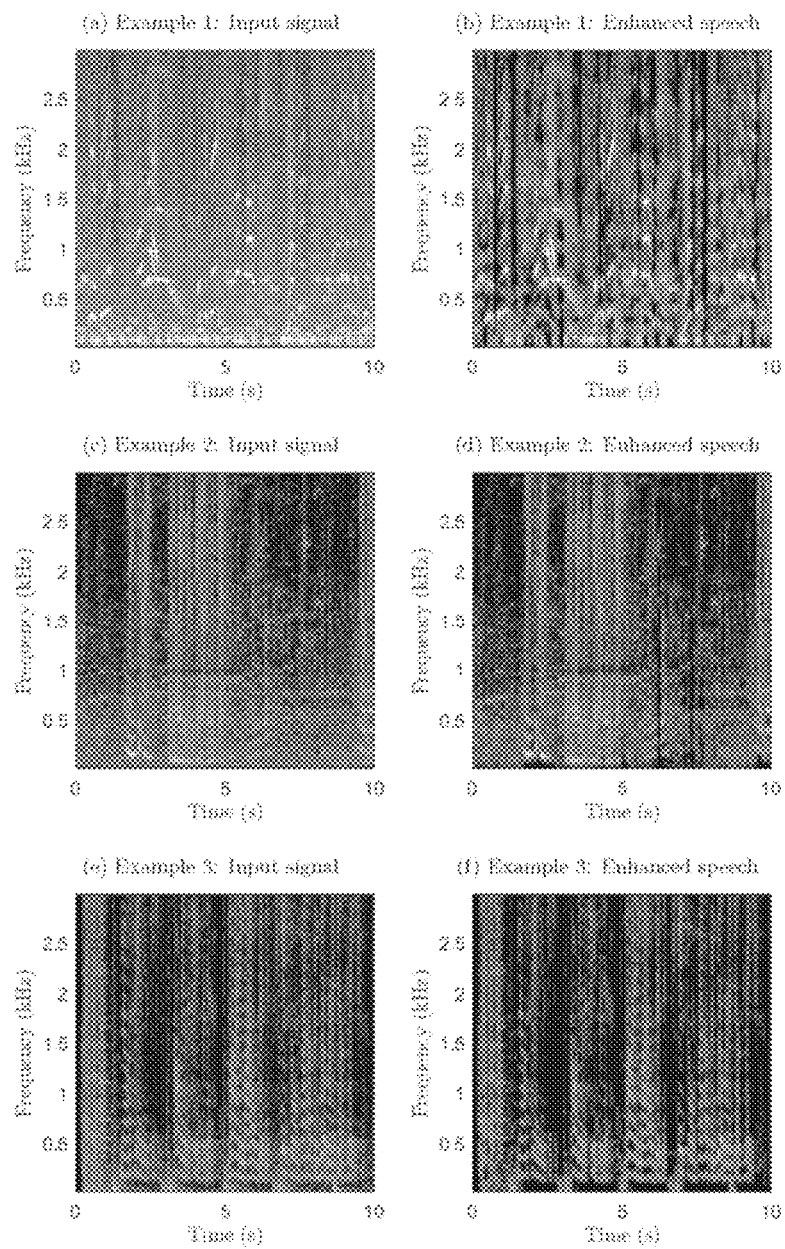
FIG. 12 shows examples of speech enhancement in the form of time/frequency spectrograms.

Using the NMF dictionary, speech enhancement was performed on a different set of items, from which the original components were unknown. Some of these items are shown in FIG. 12. The first item, consisting of a man and a woman talking to each other while a rock band is playing in the background, is one of the most representative examples of the speech enhancement algorithm. The algorithm managed to suppress significantly the music while keeping the conversation intact and some leakage from the singer (also speech) and a guitar solo. This can be explained due to the similarity of the guitar sound with speech, both being tonal and even harmonic. The second item consists of a conversation between a man and a woman in a restaurant with piano music softly playing in the background and some cutlery noise. In this item, the separation seemed to be less noticeable than in the previous item, having some leakage from the cutlery noise (around time 7.5 s). The third item is a monologue of a woman with musical background, consisting of trumpets, percussion instruments and choral voices. The separation in this case seems to be less prominent than in the previous cases, especially due to leakage from the trumpets and choral voices when sounding at the same time (first seconds).

Figure 13:
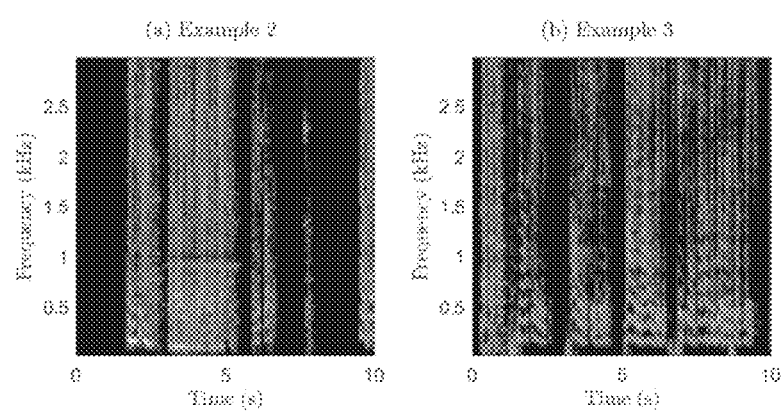
FIG. 13 shows time/frequency spectrograms of speech enhancement results using speech gating in post-processing.

To reduce the leakage in the second and the third items, a post-processing comprising speech gating was applied, using voice activity detection (VAD). The VAD is based on the power of the enhanced speech. The results of this procedure are shown in FIG. 13. Note that the separation was improved consistently in the segments where speech is present, although in the third item the trumpet sound is not suppressed, since it is mixed with speech and has enough power to pass the gating threshold.

Figure 14:
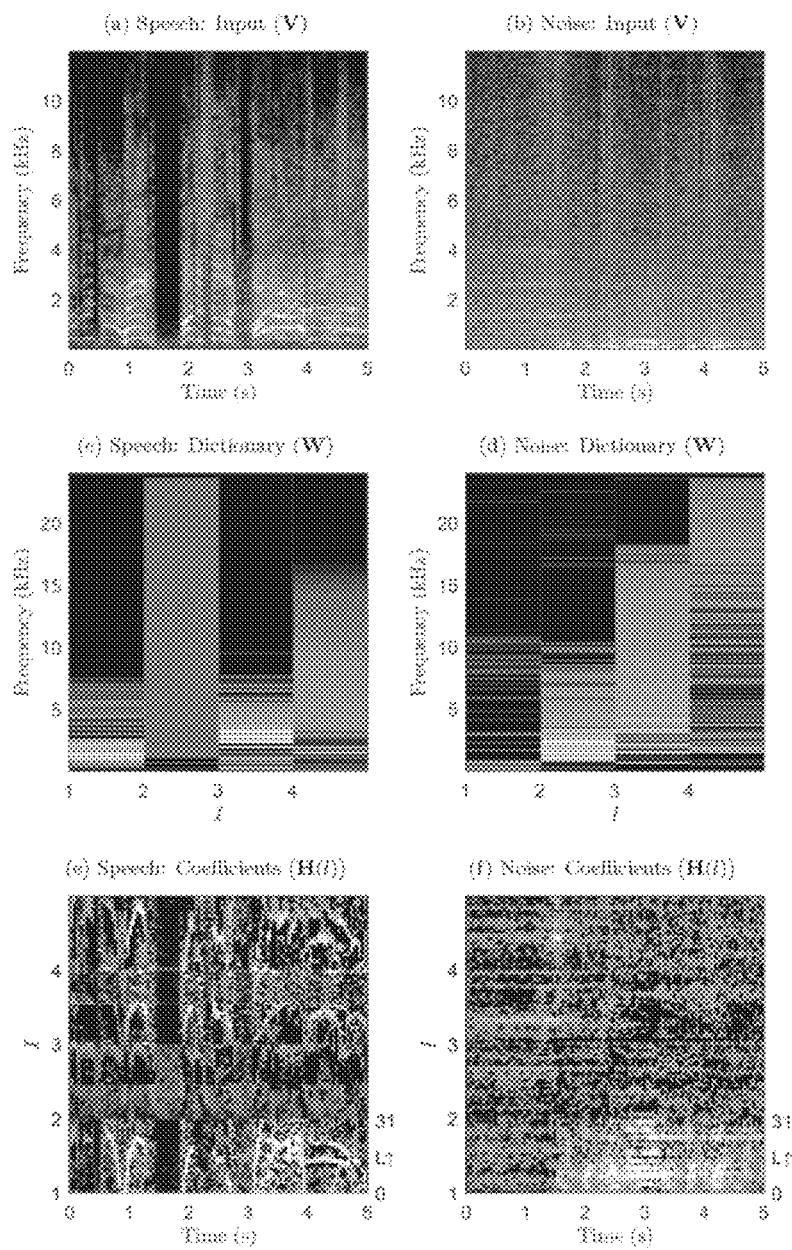
FIG. 14 are time/frequency spectrograms illustrating the first layer of the multilayer CNMF disclosed herein.
Figure 15:
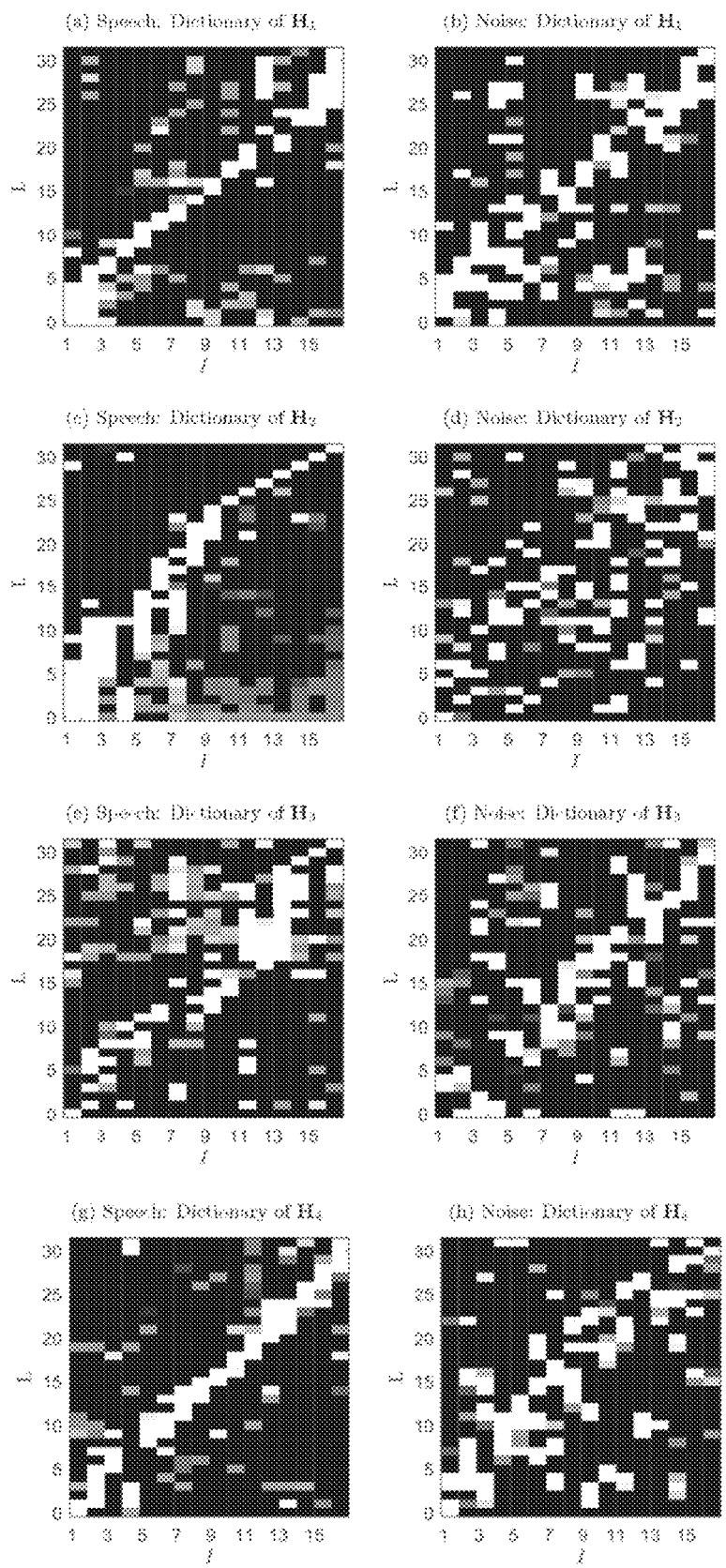
FIG. 15 are time/frequency spectrograms illustrating the second layer of the multilayer CNMF disclosed herein.

The final experiments for speech enhancement applications were performed with the multilayer β-CNMF presented hereinabove. A proof of concept of this algorithm for the two-layer case was performed on the components of the first audio signal shown in this section. The purpose of this experiment was to show that the speech and background dictionaries obtained in each layer are sufficiently different. First, in the first layer, CNMF was applied on each component giving the results shown in FIG. 14. Then, the coefficient matrices obtained from the CNMF were factorized using NMF in the second layer. The dictionaries obtained from the second layer are shown in FIG. 15. Note how the dictionaries in the first layer have similar basis vectors, which can result in leakage, while in the second layer they are more distinctive.

Figure 16:
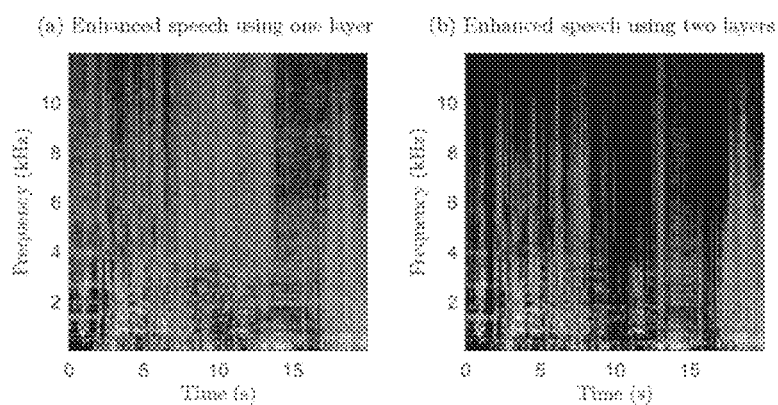
FIG. 16 are time/frequency spectrograms illustrating speech enhancement results of the multilayer CNMF disclosed herein.

Using the learned speech dictionaries for this item, in conjunction with the already known non-convolutional dictionary from the previous experiments, multilayer speech enhancement was performed on the audio signal obtained by mixing the two components, the same signal as in FIG. 9. The results of this procedure are shown in FIG. 16, comparing the single- and two-layer cases. It can be noted that some of the leakage was reduced in the second layer. The two-layer approach managed to reduce the hiss and low-frequency buzz that was leaked in the first layer, therefore resulting in a more pleasant reconstruction.

CONCLUSION AND FINAL REMARKS

The present disclosure provides new variants of non-negative matrix factorization suitable for separating desired audio content from undesired audio content. In certain embodiments, a multi-dimensional non-negative representation of an audio signal is decomposed into desired content and undesired content by performing convolutional non-negative matrix factorization (CNMF) on multiple layers, each layer having a respective non-negative matrix representation. In certain embodiments, the desired content is represented by a first dictionary and the undesired content is represented by a second dictionary, and sparsity is imposed on activations of basic elements of the first or the second dictionary, wherein a degree of sparsity is controlled by setting a minimum number of components with significant activations of the first or second dictionary, respectively.

Examples of suitable computer-readable media include random access memory (RAM), read only memory (ROM), a magnetic medium such as a hard-drive or a floppy disk, an optical medium such as a compact disk (CD) or DVD (digital versatile disk), a solid state drive, flash memory, and any other memory chip or cartridge. The computer-readable medium may be any combination of such storage devices. Computer-readable media encoded with the software/program code may be packaged with a compatible device such as a user device or a server, or provided separately from other devices. Any such computer-readable medium may reside on or within a single computing device or an entire computer system, and may be among other computer-readable media within a system or network.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

While the subject matter of this application has been particularly shown and described with reference to specific implementations thereof, it will be understood by those skilled in the art that changes in the form and details of the disclosed implementations may be made without departing from the spirit or scope of this disclosure. In addition, well known features may not have been described in detail to promote clarity. Finally, although advantages have been discussed herein with reference to some implementations, it will be understood that the scope should not be limited by reference to such advantages. Rather, the scope should be determined with reference to the appended claims.

What is claimed is:

1. An audio processing method comprising:
training a first dictionary for clean desired content;
receiving an audio signal to be processed, and providing a multi-dimensional non-negative representation of the received audio signal;
learning a second dictionary for undesired content;
decomposing the multi-dimensional non-negative signal representation into desired content and undesired content by performing convolutional non-negative matrix factorization (CNMF) in multiple layers, each layer having a respective non-negative matrix representation; wherein the desired content is represented by the first dictionary and a first set of coefficients, and the undesired content is represented by the second dictionary and a second set of coefficients; and
separating the desired content from the undesired content.

2. The method of claim 1, wherein
in a first layer of the CNMF, the signal representation is decomposed into the first and second dictionaries with the corresponding first and second sets of coefficients; and
in each higher layer of the CNMF, the representation from the previous layer is factorized further into a higher layer dictionary and a new representation.

3. The method of claim 1, wherein the desired content includes speech.

4. The method of claim 1, wherein the desired content is separated from the undesired content by weighting or by multiplication of the dictionary representing the desired content and the obtained coefficients for the desired content.

5. The method of claim 1, wherein the multi-dimensional non-negative signal representation is a two-dimensional time-frequency spectrogram, obtained by performing a short-time Fourier transform.

6. The method of claim 1, wherein the first dictionary comprises a plurality of sub-directories, each sub-directory comprising, respectively, one or more basic components of a typical pattern for a given representation of an object of interest.

7. The method of claim 1, further comprising imposing sparsity on activations of basic elements of the first or the second dictionary, wherein a degree of sparsity is controlled by setting a minimum number of components with significant activations of said first or second dictionary.

8. The method of claim 1, wherein the decomposing is performed using at least one dictionary in addition to the first dictionary and the second dictionary.

9. The method of claim 1, comprising performing multi-channel CNMF by training or learning a common dictionary across multiple channels.

10. The method of claim 1, further comprising enhancing the desired content after separating the desired content from the undesired content.

11. An audio processing method comprising:
training a first dictionary for clean desired content;
receiving an audio signal to be processed, and providing a multi-dimensional non-negative representation of the received audio signal;
learning a second dictionary for undesired content;
decomposing the multi-dimensional non-negative signal representation into desired content and undesired content; wherein the desired content is represented by the first dictionary and the undesired content is represented by the second dictionary, and wherein the multi-dimensional non-negative signal representation has at least two dimensions and includes a forward and an inverse transform;
imposing sparsity on activations of basic elements of the first or the second dictionary, and
separating the desired content from the undesired content by performing convolutional non-negative matrix factorization (CNMF) in multiple layers, each layer having a respective non-negative matrix representation.

12. The method of claim 11, wherein imposing sparsity comprises controlling a degree of sparsity by setting a minimum number of components with significant activations of said first or second dictionary.

13. The method of claim 11, wherein the desired content includes speech.

14. The method of claim 11, wherein separating the desired content from the undesired content comprises performing spectral weighting.

15. The method of claim 11, wherein the multi-dimensional non-negative signal representation is a two-dimensional time-frequency spectrogram.

16. The method of claim 11, wherein the first dictionary comprises a plurality of sub-directories, each sub-directory comprising, respectively, one or more basic components of a typical pattern for a given representation of an object of interest.

17. The method of claim 11, wherein the decomposing is performed using at least one dictionary in addition to the first dictionary and the second dictionary.

18. The method of claim 11, comprising performing multi-channel CNMF by training or learning a common dictionary across multiple channels.

19. A system comprising:
one or more processors; and
a non-transitory computer-readable medium storing instructions that, when executed by the one or more processors, cause the one or more processors to perform an audio processing method comprising:
training a first dictionary for clean desired content;
learning a second dictionary for undesired content;
decomposing a multi-dimensional non-negative signal representation of a received audio signal into desired content and undesired content by performing convolutional non-negative matrix factorization (CNMF) in multiple layers, each layer having a respective non-negative matrix representation; wherein the desired content is represented by the first dictionary and the undesired content is represented by the second dictionary, and wherein the multi-dimensional non-negative signal representation has at least two dimensions and includes a forward and an inverse transform; and
separating the desired content from the undesired content.

20. A non-transitory computer-readable medium storing instructions that, when executed by one or more processors, cause the one or more processors to perform an audio processing method comprising:
training a first dictionary for clean desired content;
learning a second dictionary for undesired content;
decomposing a multi-dimensional non-negative signal representation of a received audio signal into desired content and undesired content by performing convolutional non-negative matrix factorization (CNMF) in multiple layers, each layer having a respective non-negative matrix representation; wherein the desired content is represented by the first dictionary and the undesired content is represented by the second dictionary, and wherein the multi-dimensional non-negative signal representation has at least two dimensions and includes a forward and an inverse transform; and separating the desired content from the undesired content.

\* \* \* \* \*